United States Patent
Jarugubilli et al.

(10) Patent No.: US 10,621,398 B2
(45) Date of Patent: Apr. 14, 2020

(54) METHODS AND SYSTEMS FOR OPERATING AN INDICIA SCANNER

(71) Applicant: HAND HELD PRODUCTS, INC., Fort Mill, SC (US)

(72) Inventors: Sreekanth Jarugubilli, Hyderabad (IN); Vijaya Bhaskar Ramisetti, Hyderabad (IN); Ujjwal Kapoor, Delhi (IN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 16/242,625

(22) Filed: Jan. 8, 2019

(65) Prior Publication Data
US 2019/0286864 A1    Sep. 19, 2019

(30) Foreign Application Priority Data
Mar. 14, 2018    (IN) .............................. 201811009357

(51) Int. Cl.
*G06K 7/10*    (2006.01)
*G06K 7/14*    (2006.01)

(52) U.S. Cl.
CPC ....... *G06K 7/10881* (2013.01); *G06K 7/1417* (2013.01); *G06K 2007/10524* (2013.01)

(58) Field of Classification Search
USPC ..................................................... 235/462.1
See application file for complete search history.

(56) References Cited

U.S. PATENT DOCUMENTS

| | | | |
|---|---|---|---|
| 2008/0136916 A1 | 6/2008 | Wolff | |
| 2010/0321482 A1 | 12/2010 | Cleveland | |
| 2012/0002063 A1* | 1/2012 | Lee | H04N 5/23219 348/211.2 |
| 2016/0188941 A1* | 6/2016 | Todeschini | G06K 7/10722 235/462.11 |

* cited by examiner

Primary Examiner — Rafferty D Kelly
(74) Attorney, Agent, or Firm — Alston & Bird LLP

(57) ABSTRACT

Various embodiments illustrated herein disclose an apparatus that includes a sensor configured to track at least an eye movement and a head gradient of a user to determine gaze data, while the user views an indicia in a predetermined area defined external to the apparatus. Further, the apparatus includes a controller configured to determine first coordinates of the indicia based on the gaze data. Furthermore, the controller transforms the first coordinates of the indicia to second coordinates. Thereafter, an image capturing assembly modifies a focal length of the image capturing assembly to focus on the indicia based on the second coordinates of the indicia. Further, the image capturing assembly captures capture an image of the field of view such that the captured image comprises the focused indicia. Subsequently, the focused indicia, included in the captured image, is decoded.

20 Claims, 15 Drawing Sheets

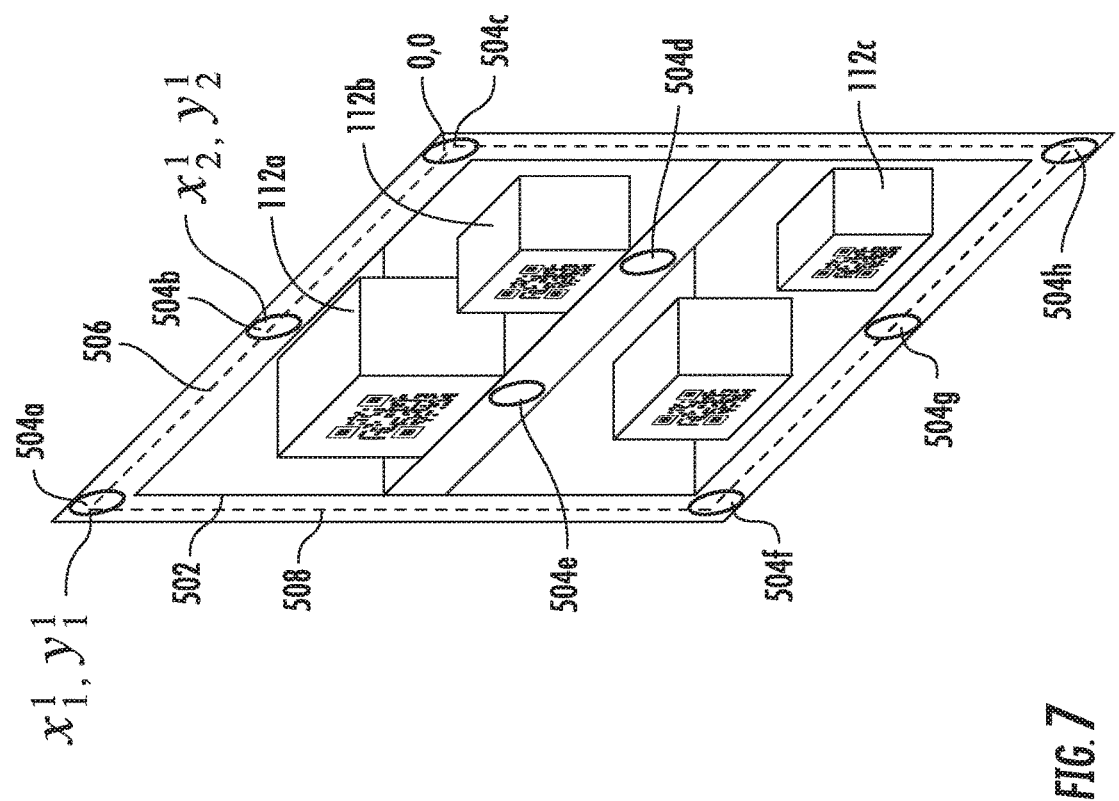
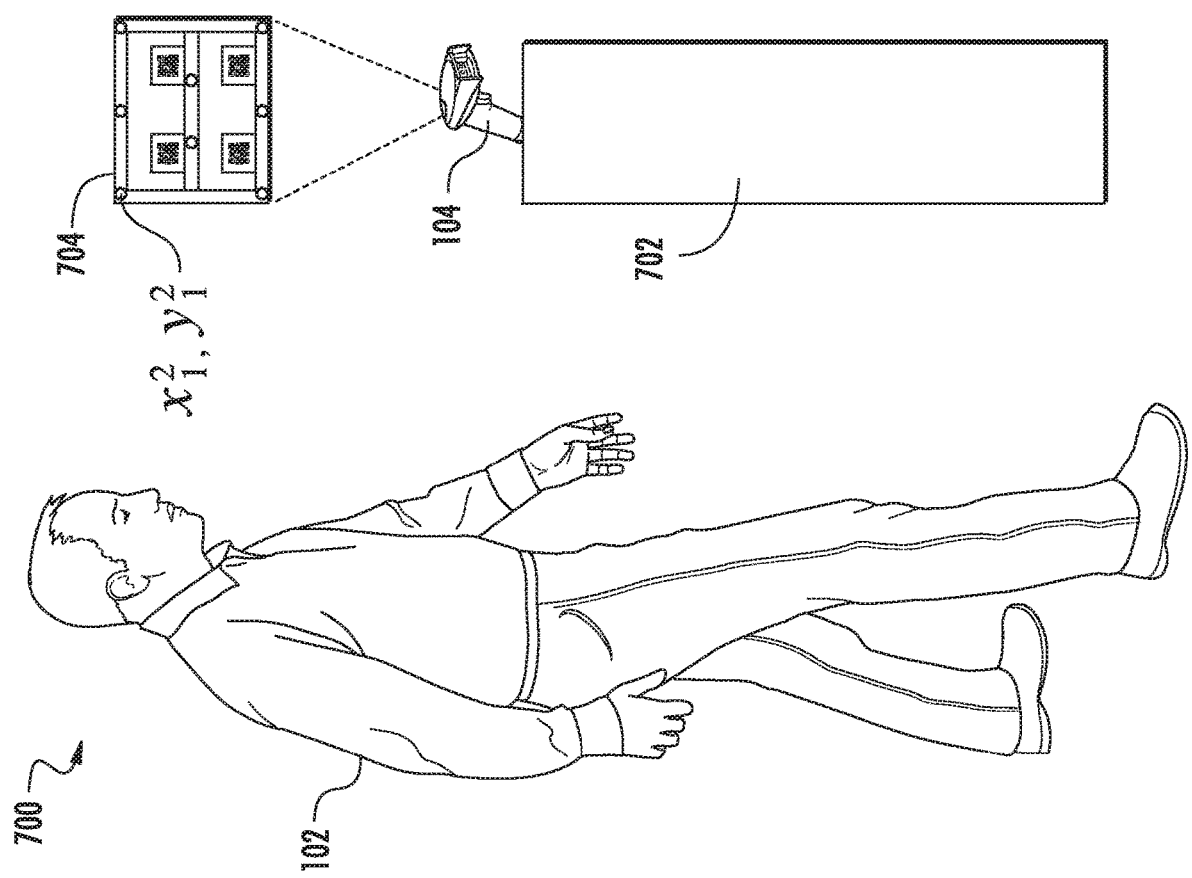
FIG. 7

METHODS AND SYSTEMS FOR OPERATING AN INDICIA SCANNER

CROSS-REFERENCE TO RELATED APPLICATIONS

This application claims priority to Indian Provisional Patent Application No. 201811009357, filed Mar. 14, 2018, the entire contents of which are incorporated herein by reference.

TECHNOLOGICAL FIELD

Example embodiments of the present disclosure relate generally to an indicia scanner and, more particularly, to example methods and systems for operating the indicia scanner.

BACKGROUND

A typical indicia scanner is configured to read data, encoded in the form of an indicia. Usually, to read the data, the indicia scanner (for example a bar code scanner) may capture an image of the indicia (for example a QR code). Thereafter, the indicia scanner may analyze the image to decode the data from the indicia. In certain scenarios, the indicia in the captured image may be out of focus, which may further lead to an erroneous decoding of the indicia.

Applicant has identified a number of deficiencies and problems associated with conventional indicia scanner, and other associated systems and methods. Through applied effort, ingenuity, and innovation, many of these identified problems have been solved by developing solutions that are included in embodiments of the present disclosure, many examples of which are described in detail herein.

BRIEF SUMMARY

In accordance with various illustrated embodiments, a method includes receiving, by a controller, gaze data from a sensor in an indicia scanner, wherein the gaze data is representative of at least one of a tracked eye movement and a head gradient of a user. The method further includes determining, by the controller, a point being viewed by the user based on the received gaze data. The determination of the point being viewed by the user includes determining, by the controller, whether the point being viewed is within a predetermined area defined external to the indicia scanner. Further, the determination of the point being viewed by the user includes determining, by the controller, the first coordinates of the point based on the received gaze data and based on the determination that point is within the predetermined area, the first coordinates being determined in a first coordinate system that is defined based on the predetermined area. Furthermore, the method includes transforming, by the controller, the first coordinates of the point to second coordinates in a second coordinate system based on a defined relationship between the first coordinate system and the second coordinate system. The second coordinate system is defined based on a field of view of an image capturing assembly in the indicia scanner. Thereafter, the method includes causing, by the controller, a focal length of the image capturing assembly to be modified to focus on at least the point based on the second coordinates of the point. Subsequently, an image of the field of view is captured.

In accordance with various illustrated embodiments, an apparatus includes a sensor configured to track at least an eye movement and a head gradient of a user to determine gaze data, while the user views an indicia in a predetermined area defined external to the apparatus. Further, the apparatus includes a controller communicatively coupled to the sensor. The controller is configured to determine first coordinates of the indicia based on the gaze data. The controller is further configured to transforms the first coordinates of the indicia to second coordinates. Thereafter, an image capturing assembly modifies a focal length of the image capturing assembly to focus on the indicia based on the second coordinates of the indicia. Further, the image capturing assembly captures capture an image of the field of view such that the captured image comprises the focused indicia. Subsequently, the focused indicia, included in the captured image, is decoded.

In accordance with various illustrated embodiments, an indicia scanner includes a housing comprising a portion having a first end and a second end. The first end is proximal to an object during capturing of an image of the object. The second end is distal from the object during capturing of the image of the object. The indicia scanner further includes a sensor positioned at the second end of the portion. The sensor is configured to track at least an eye movement and a head gradient to determine gaze data, while the user views an indicia in a predetermined area defined external to the indicia scanner. Further, the indicia scanner includes a control system enclosed in the housing. The control system includes a controller configured to determine first coordinates, in a first coordinate system, of the indicia based on the gaze data. Further, the controller is configured to transform the first coordinates of the indicia to second coordinates in a second coordinate system. The indicia scanner further includes an image capturing assembly positioned at the first end of the portion, wherein the image capturing assembly is configured to modify a focal length of the image capturing assembly to focus on the indicia, based on the second coordinates of the indicia, wherein the second coordinates of the indicia are deterministic of a location of the indicia in a field of view of the image capturing assembly. Additionally, the image capturing assembly is configured to capture an image of the field of view of the image capturing assembly, wherein the captured image comprises focused indicia, and wherein the focused indicia is decoded.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates yet another and/or additional example calibration of a sensor and an image capturing assembly, in the indicia scanner, in accordance with one or more embodiments described herein;

DETAILED DESCRIPTION

Figure 1:
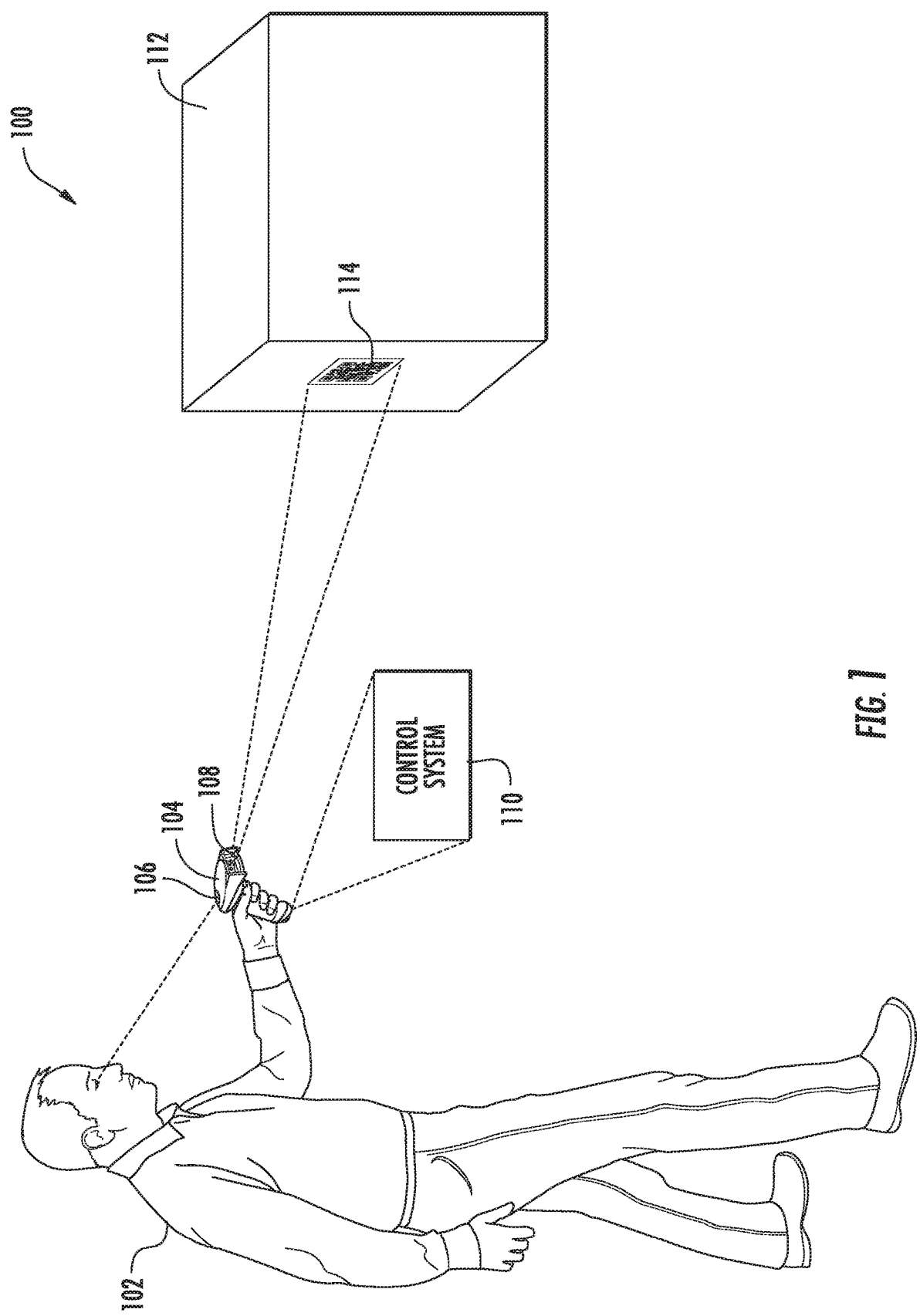
FIG. 1 illustrates an exemplary environment where various example embodiments of the disclosure may be implemented, in accordance with one or more embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "indicia", as used in some examples herein, is intended to include any machine-readable indicia, including barcodes, QR codes, matrix codes, 1D barcodes, 2D barcodes, RFID tags, IR tags, near-field-communication (NFC) tags, photographs, UPC code, and characters that are readable by a computing device (for example, an indicia scanner). Indicia are typically graphical representations of information (e.g., data), such as product numbers, package tracking numbers, patient identification numbers, medication tracking identifiers, personnel identification numbers, etc.

In some examples, items, such as packages, items for sale, medical bracelets, and the like, may have indicia near or otherwise in the vicinity of each other that may confuse or detract from the scanning process. For example, at the checkout area of a supermarket, many different items may be placed right next to each other leading to problems associated with scanning the wrong item and/or not knowing which item was scanned. Moreover, it's common that a single item has multiple different indicia placed right next to each other on the item, such as a medical bracelet, or an item being shipped via mail. This creates a dilemma for an indicia scanner user as to which indicia should be scanned and, once the proper indicia to be scanned is determined, determine how to focus the scanner so as to capture the selected indicia.

Moreover, most conventional indicia scanners cannot operate properly when there are multiple indicia in the field of view as the scanner cannot determine which of the plurality of indicia in the field of view it is to focus on and capture/decode. One solution to this problem is manually adjusting the indicia scanner and/or items so only one indicia is present in the field of view. For example, manually placing indicia of a cereal box right next to a barcode scanner. However, manually adjusting placement of items and/or indicia scanners is, in some examples, inefficient. Therefore, a need exists for indicia scanners that can flexibly scan only the desired indicia among many indicia in the field of view without extensive manual adjustment to enable more efficient processing of indicia.

Example embodiments described herein provide methods and systems that facilitate operation of an indicia scanner by using a sensor to track an eye movement and/or a head gradient of a user to identify a location viewed by the user. In some examples, the eye movement of the user signifies the user's intent as to which indicia to scan. That is, if there were many indicia on a package, the user would be looking at the indicia that the user intends the indicia scanner scan and decode.

In some examples, the indicia scanner is configured to automatically scan the location viewed by the user. Therefore, the user can select which particular indicia to scan within a field of view by simply looking at the indicia. For example, a user may look at a UPC code placed on a cereal box in the checkout lane for a predetermined amount of time, once the predetermined amount of time passes the indicia scanner will scan the UPC code on the cereal box upon activation of the scanner.

In some example embodiments, the sensor determines the location viewed by the user. In such examples, the location viewed is defined by a first coordinate system. The first coordinate system is configured to use numbers to represent a location from two fixed lines (i.e., axis of the first coordinate system) within a predetermined area. That is, the predetermined area, such as an area in the checkout lane, may be assigned a grid system, a frame of reference, or the like, such that a point within the predetermined area is represented by one or more coordinates. For example, the sensor may determine that the location of the UPC code on the cereal box looked by the user corresponds to point (3,3) in the first coordinate system. In an example embodiment, the predetermined area is defined external to the indicia scanner.

After determining the one or more coordinates (hereinafter interchangeably referred to as first coordinates) that represent the location of the point being viewed by the user in the first coordinate system, the indicia scanner may be configured to transform the one or more coordinates in the first coordinate system to a second coordinate in a second coordinate system. In an example embodiment, the second coordinate system is utilized by an image capturing assembly in the indicia scanner to define a location within its field of view. For example, the location (3,3) in the first coordinate system may be transformed to the location (2,2) in the second coordinate system. That is, the location (2,2) is representative of the point being viewed by the user mapped onto the field of view the image sensor. Since the location of the point in the field of view of image capturing assembly is known the indicia scanner will be able to utilize auto focus techniques to focus on the location viewed by the user (e.g., the location of the UPC code on the cereal box). Further, the scanner, in some examples, may scan and decode the indicia (e.g., the UPC code on the cereal box).

FIG. 1 illustrates an exemplary environment 100 where various example embodiments of the present disclosure may be implemented. The exemplary environment 100 depicts a user 102 and an indicia scanner 104. The indicia scanner 104 includes a sensor 106, an image capturing assembly 108, and a control system 110. In an example embodiment, the user 102 may hold the indicia scanner 104 to operate the indicia scanner 104 to capture one or more images. For example, the user 102 may operate the indicia scanner 104 to capture an image of the object 112.

In an example embodiment, the user 102 may correspond to an operator working in a work area. The work area, as used in some examples herein, is intended to include worksites where one or more predetermined operations may be performed by one or more machines and one or more users. Some examples of the work area may include, but are not limited to, an assembly line, a warehouse, and a retail store. Further, some examples of the predetermined operation performed by the one or more users, such as the user 102, may include using the indicia scanner 104 to capture an image of the object 112. Further, to capture the image of the object, the user 102 may provide an input on the indicia scanner 104. For example, the input may correspond to pushing a trigger button on the indicia scanner 104, providing a voice input to the indicia scanner 104, one or more gestures, and/or the like.

In an example embodiment, the indicia scanner 104 may correspond to a mobile device, such as a hand-held indicia scanner, a portable data terminal, mobile phone, a tablet, portable computer, etc., or may be a stationary terminal being fixed to a single position, such as along an assembly line, which is capable of capturing the one or more images. In an example embodiment, the indicia scanner 104 includes the sensor 106 that may be configured to track eye movement and head gradient of the user 102, as is further described in at least FIGS. 4a, 4b, 4c and FIGS. 9a, 9b, 9c.

In an example embodiment, the head gradient corresponds to an orientation of the head of the user 102 with respect to a reference orientation. In some example embodiments, the reference orientation may correspond to predefined positions of one or more features of the head, such as eyes, nose, ears, and/or the like, in a field of view of the sensor 106. The predefined positions of the one or more features of the head of the user 102 may be defined with respect to a fictional plane that is perpendicular to the plane of the field of view of the sensor 106. When the user 102 moves the head, the sensor 106 is configured to track the change in the position of the one or more features of the head to determine the orientation of the head.

Based on the tracking of the eye and the head gradient of the user 102, the control system 110 in the indicia scanner 104 is configured to identify a location of a point being viewed by the user 102, as is further described in at least FIGS. 4a, 4b, 4c and FIGS. 9a, 9b, 9c. Thereafter, the control system 110 may be configured to instruct the image capturing assembly 108 to capture an image such that the captured image includes the point being viewed by the user 102. Further, in some example embodiments, the control system 110 may instruct the image capturing assembly 108 to focus on the point (being viewed by the user 102) prior to capturing the image, as is described in at least FIGS. 9a, 9b, and 9c. Further, in some example embodiments, prior to capturing the image, the control system 110 may determine whether the point being viewed by the user 102 is within a field of view of the image capturing assembly 108, as is described in at least FIGS. 9a, 9b, and 9c. If the control system 110 determines that the point being viewed by the user 102 is not within the field of view of the image capturing assembly 108, the control system 110 may at least provide instructions to the user 102 to modify an orientation of the indicia scanner 104 to bring the point being viewed by the user 102 in the field of view of the image capturing assembly 108, as is further described in at least FIGS. 9a, 9b, and 9c. Thereafter, the control system 110 may be configured to instruct the image capturing assembly 108 to capture the image based on an input received from the user 102. In an example embodiment, the input may correspond to pushing of the trigger button on the indicia scanner 104, the audio input, and/or the one or more gestures. The operation and structure of the control system 110 has been described later in conjunction with FIG. 3.

Figure 4A:
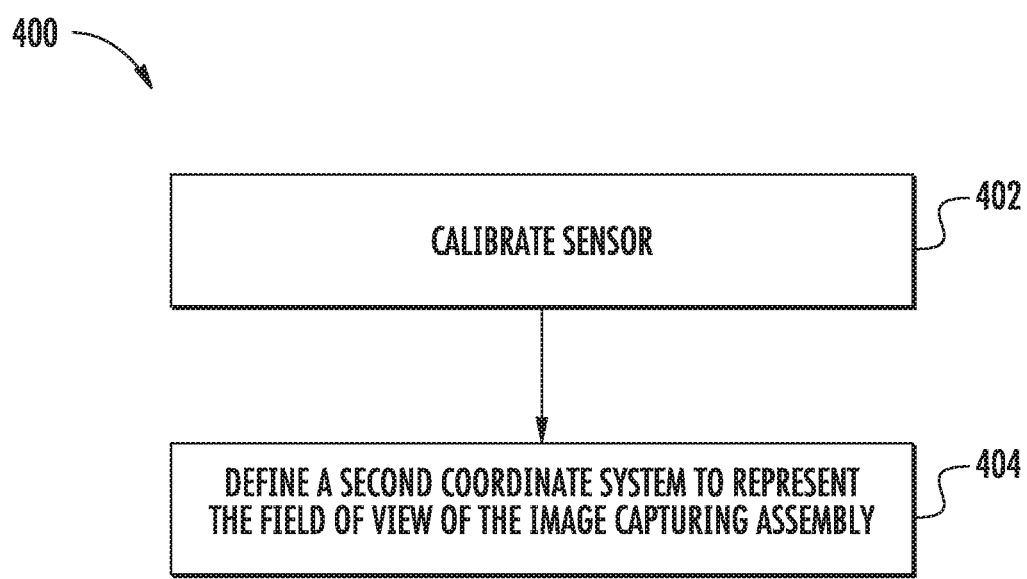
FIGS. 4a, 4b, and 4c illustrate flowcharts of a method for calibrating the indicia scanner, in accordance with one or more embodiments described herein.
Figure 4B:
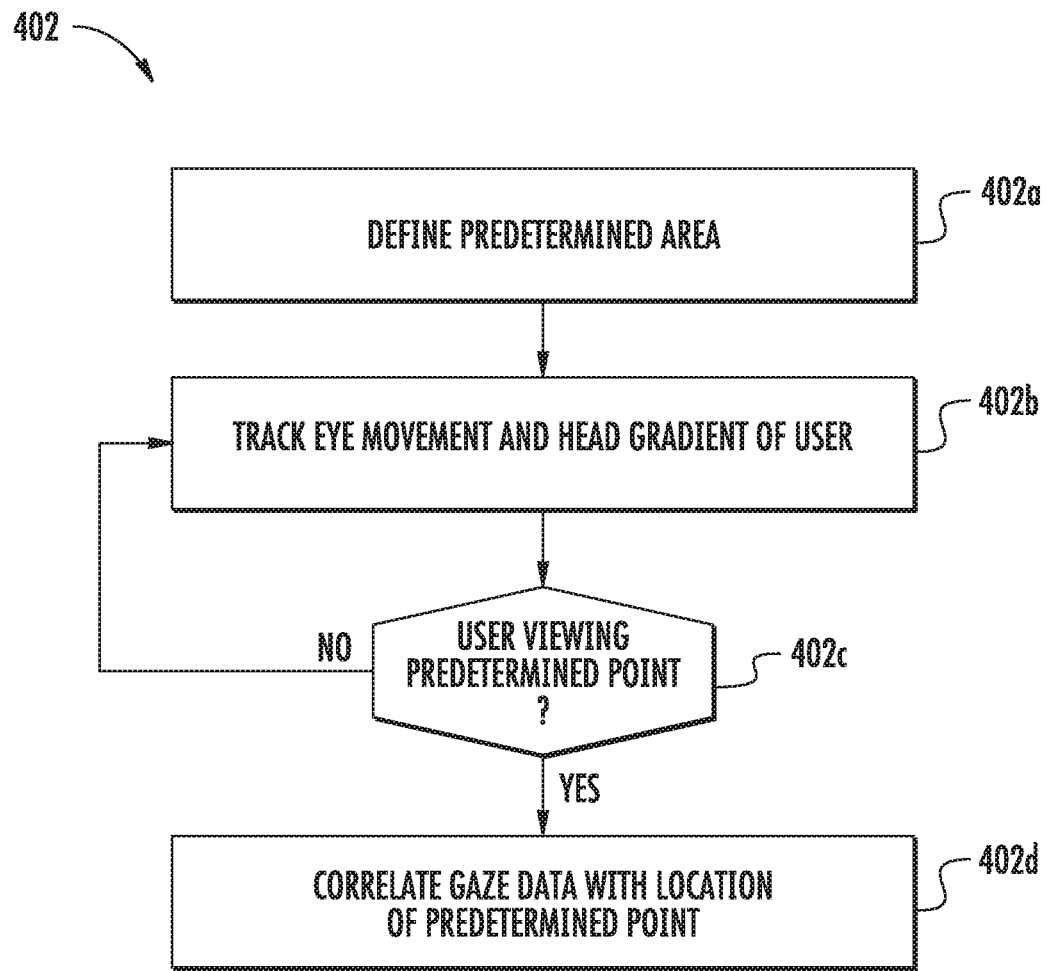
Figure 4C:
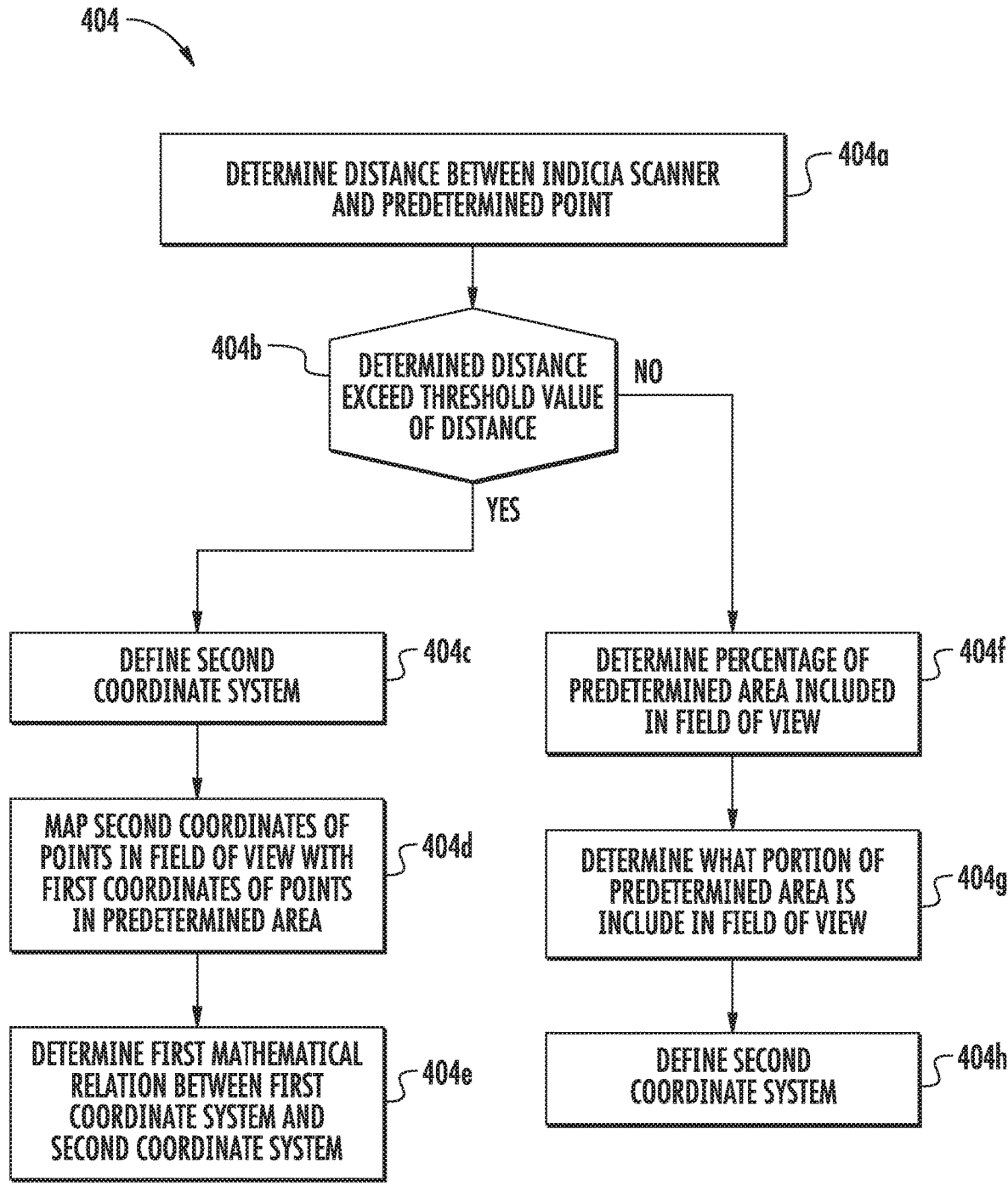

The sensor 106, in some examples, corresponds to an image capturing device that is configured to search for a face of the user 102, to identify the user's eyes, and to identify their pupils, as is further described in FIGS. 4a, 4b, and 4c. Further, the sensor 106 tracks the eyes to determine a location of the point being viewed by the user 102, in a predetermined area, as is further described in FIGS. 4a, 4b, and 4c. In an example embodiment, the location of the point may correspond to one or more coordinates (hereinafter interchangeably referred to as first coordinates) of the point in the predetermined area. A description of determination of the first coordinates of the point being viewed by the user 102 is disclosed with respect to FIGS. 9a, 9b, and 9c. In an example embodiment, the predetermined area may correspond to an area that is defined in the work area (external to the indicia scanner 104) that may serve as a grid system, and/or a frame of reference for the sensor 106. In some example embodiments, the predetermined area is defined by one or more coordinates in a first coordinate system. The defining of the predetermined area is disclosed in conjunction with FIGS. 4a, 4b, and 4c.

Additionally, or alternately, the sensor 106 may be further configured to track the head gradient of the user 102 to determine the location of the point being viewed by the user 102. In an example embodiment, the tracking of the head gradient may correspond to tracking an orientation of the head of the user 102. In an example embodiment, the sensor 106 may be configured to track the eye movement based on the tracking of the head gradient of the user 102. A description of tracking of the head gradient has also been described in conjunction with FIGS. 4a, 4b, and 4c.

The imaging capturing assembly 108 may include an illumination assembly to illuminate a field of view of the imaging capturing assembly. The illumination assembly may, for example, include an illumination source, an illuminating optics assembly, such as one or more lenses, diffusers, wedges, reflectors or a combination of such elements, for directing light from illumination source in the direction of the field of view. For example, if the image of the object 112 is to be captured, the illumination assembly may be configured to direct the light on the object 112. Some examples of the illumination source may include, for example, laser or light emitting diodes (LEDs) such as white LEDs or red LEDs. Further, the image capturing assembly 108 includes an imaging assembly that may further include an image sensor, such as a color or monochrome 1D or 2D CCD, CMOS, NMOS, PMOS, CID or CMD solid state image sensor, together with an imaging optics assembly for receiving and focusing an incident light (from the ambient) on the image sensor.

In an example embodiment, the imaging optics assembly may include an autofocus lens assembly that may include one or more lens elements, such as fluid elements, electrowetting fluid elements, and/or non-deformable solid elements, such as glass, polycarbonate, or other materials known to those of ordinary skill in the art. Each of these lens elements can be dimensioned, spaced, positioned, and generally constructed to adjust a focal point of the incident light onto the image sensor. For example, the imaging optics assembly may be configured to focus on the point being viewed by the user 102. In an example embodiment, the image capturing assembly 108 further includes a depth sensor that may be configured to capture a depth image of a field of view of the image capturing assembly 108 using one or more technologies such as, but not limited to, a structured light, time of flight, and stereoscopy. The depth image may include information pertaining to a distance of one or more points in a field of view of the image capturing assembly 108 from the indicia scanner 104. For example, the depth sensor may be configured to determine the distance of the point, being viewed by the user, from the indicia scanner 104.

The control system 110 is communicatively coupled with the sensor 106 and the imaging capturing assembly 108. Further, the control system 110 may include suitable logic and/or circuitry to control one or more operations of the indicia scanner 104. For example, the control system 110 may be configured to transmit an instruction to the sensor 106 to track eye movement and head gradient of the user 102 to determine the location of the point, within the predetermined area, being viewed by the user 102. Further, based on the location of the point, the control system 110 may be configured to transmit an instruction to the image capturing assembly 108 to focus on the point being viewed by the user 102 and accordingly capture the image that includes the point.

Alternatively or additionally, the control system 110 may be configured to utilize one or more image processing techniques to retrieve information from the captured image. For example, the control system 110 may be configured to retrieve the information from the point (such as an indicia 114 printed on the object 112) being viewed by the user 102. In some examples, the control system 110 may be configured to utilize one or more image processing techniques to decode the indicia 114 to retrieve the encoded information. The structure and the operation of the control system 110 has been described later in conjunction with FIG. 3.

In some examples, the scope of the disclosure is not limited to the indicia scanner 104 configured to track the eye movement of the user 102 and accordingly capture the image. Any image capturing device, such as mobile computing device, a mobile device in a sled, and/or the like, that has the sensor 106 (configured to track the eye movement and head gradient of the user 102) and the image capturing assembly 108, may be utilized to track the eye movement and the head gradient of the user 102 and accordingly capture the image.

In some example embodiments, the object 112 may correspond to an item, which is to be captured by the indicia scanner 104. Some examples of the object 112 may include, but are not limited to, a package, a carton, and a document. In an example embodiment, the object 112 may have a predetermined pattern printed on it. The predetermined pattern may correspond to the indicia and/or symbols that may be representative of the encoded information. For example, the indicia 114 may be printed on the object 112.

In some examples, the scope of the disclosure is not limited to the user 102 holding the indicia scanner 104 to capture the image of the object 112, such as is illustrated in FIG. 1. In some examples, the indicia scanner 104 may be affixed at a first predetermined location in a work area, where the indicia scanner 104 may be utilized to capture the image. In such an embodiment, the user 102 may position herself at a second predetermined location in the work area such that the sensor 106 is pointed towards the user 102 and is able to track the eye movement and the head gradient of the user 102, as is described in FIG. 6. In yet another embodiment, the indicia scanner 104 may be movably positioned at the predetermined location in the work area. In such a scenario, the indicia scanner 104 may be mounted on a motorized hub that may be configured to modify an orientation of the indicia scanner 104 with respect to a ground surface of the work area.

Figure 2:
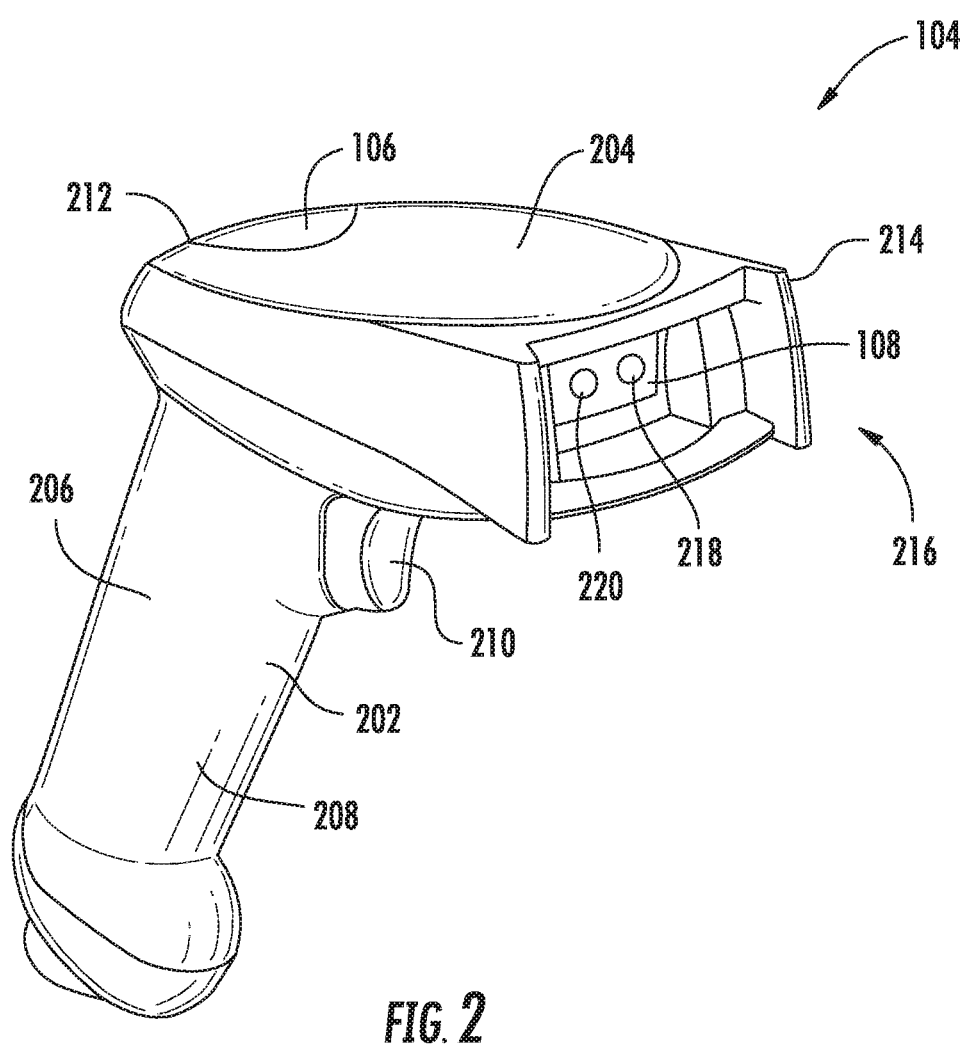
FIG. 2 illustrates a perspective view of an apparatus of an indicia scanner in accordance with one or more embodiments described herein.

FIG. 2 illustrates perspective view of an apparatus of the indicia scanner 104, in accordance with one or more example embodiments described herein. In some example embodiments, the indicia scanner 104 includes a housing 202 having an enlarged head portion 204 and a straight elongated body portion 206. The housing 202 further encloses other components of the indicia scanner 104. For example, the housing 202 encloses the control system 110 of the indicia scanner 104.

The straight elongated body portion 206 extends, in some examples, from the head portion and has a shorter circumference than a circumference of said enlarged head portion 204. In an example embodiment, the straight elongated body portion 206 is adapted to be held in a hand by the user 102. In an example embodiment, the straight elongated body portion 206 further comprises a hand grip 208 and a trigger button 210.

As is illustrated in FIG. 2, the enlarged head portion 204 includes a first end 212 and a second end 214. At the first end 212 of the enlarged head portion 204, a window 216 is defined. In an example embodiment, the imaging capturing assembly 108 may be disposed within the window 216 in the enlarged head portion 204. Further, it can be observed from FIG. 2 that the image capturing assembly includes an image sensor 218, and a depth sensor 220. In some examples, the second end 214 of the enlarged head portion 204 is positioned opposite to the window 216 (defined at the first end 212). The second end 214 is configured to receive the sensor 106.

In some examples, and during capture of the image (for example of the object 112), the imaging capturing assembly 108, positioned in the window 216, is pointed towards an area to be captured, while the sensor 106 is pointed towards the user 102 in such a manner that the sensor 106 is able to track the eye movement and the head gradient of the user 102. For example, to capture the image of the object 112, the indicia scanner 104 may be pointed to towards the object 112, while the sensor 106 is pointed towards the user 102. The tracking of the eye and the head gradient of the user 102 has been described in conjunction with FIGS. 4a, 4b, 4c and FIGS. 9a, 9b, 9c.

Alternatively or additionally, the indicia scanner 104 may be implemented in a mobile device such as a smartphone that includes a front camera and a rear camera, without departing from the scope of the disclosure. The rear camera may be configured to capture the image (for example of the object 112), while the front camera may be configured to track the eye movement and the head gradient of the user 102.

Figure 3:
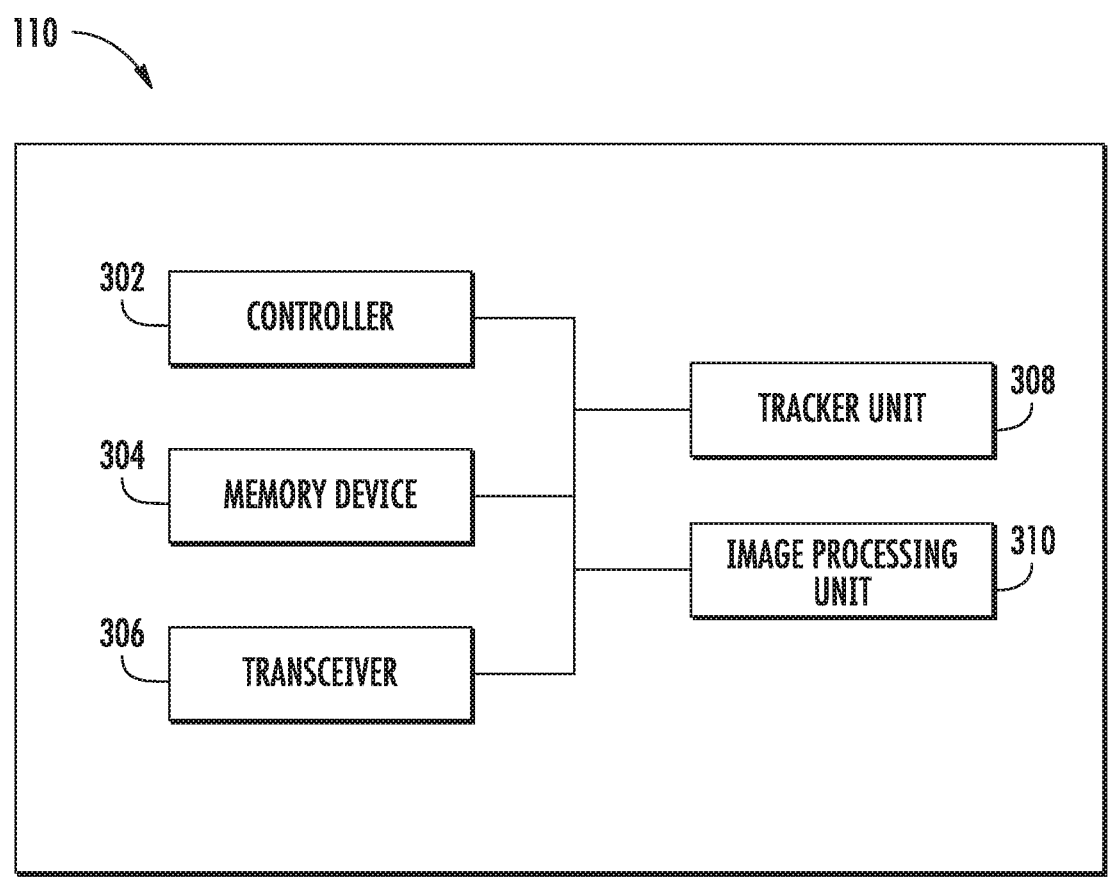
FIG. 3 illustrates a block diagram of a control system, in accordance with one or more embodiments described herein.

FIG. 3 illustrates a block diagram of the control system 110, in accordance with one or more embodiments. The control system 110 has been described in conjunction with FIG. 1 and FIG. 2 and includes a controller 302, a memory device 304, a transceiver 306, a tracker unit 308, and an image processing unit 310.

The controller 302 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof.

Accordingly, although illustrated in FIG. 3 as a single controller, in an example embodiment, the controller 302 may include a plurality of processors and signal processing modules. The plurality of processors may be embodied on a single electronic device or may be distributed across a plurality of electronic devices collectively configured to function as the circuitry of the control system 110. The plurality of processors may be in operative communication with each other and may be collectively configured to perform one or more functionalities of the circuitry of the control system 110, as described herein. In an example embodiment, the controller 302 may be configured to execute instructions stored in the memory device 304 or otherwise accessible to the controller 302. These instructions, when executed by the controller 302, may cause the circuitry of the control system 110 to perform one or more of the functionalities, as described herein.

Whether configured by hardware, firmware/software methods, or by a combination thereof, the controller 302 may include an entity capable of performing operations according to embodiments of the present disclosure while configured accordingly. Thus, for example, when the controller 302 is embodied as an ASIC, FPGA or the like, the controller 302 may include specifically configured hardware for conducting one or more operations described herein. Alternatively, as another example, when the controller 302 is embodied as an executor of instructions, such as may be stored in the memory device 304, the instructions may specifically configure the controller 302 to perform one or more algorithms and operations described herein.

Thus, the controller 302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 304 may include suitable logic, circuitry, and/or interfaces that are adapted to store a set of instructions that is executable by the controller 302 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 304 may be integrated with the controller 302 on a single chip, without departing from the scope of the disclosure.

The transceiver 306 may correspond to a communication interface that may facilitate transmission and reception of messages and data to and from various devices. Examples of the transceiver 306 may include, but are not limited to, an antenna, an Ethernet port, a USB port, a serial port, or any other port that can be adapted to receive and transmit data. The transceiver 306 transmits and receives data and/or messages in accordance with the various communication protocols, such as, Bluetooth®, Infra-Red, I2C, TCP/IP, UDP, and 2G, 3G, or 4G communication protocols.

The tracker unit 308 may include suitable logic and circuitry that may enable the control system 110 to track the eye movement of the user 102 and the head gradient of the user 102 through the sensor 106. Prior to tracking the eye movement of the user 102 and the head gradient of the user 102, the tracker unit 308 may be configured to calibrate the sensor 106.

In an example embodiment, during calibration of the sensor 106, the tracker unit 308 may be configured to define the predetermined area within which the sensor 106 is able to determine the location of the point being viewed by the user 102. The calibration of the sensor 106 and defining of the predetermined area have been described later in conjunction with FIGS. 4a, 4b, and 4c. Further, during calibration of the sensor 106, the tracker unit 308 may be configured to define the first coordinate system to represent the predetermined area, as is further described in FIGS. 4a, 4b, and 4c.

In an example embodiment, the tracker unit 308 may be further configured to receive gaze data based on tracking of the eye movement of the user 102 and the head gradient of the user 102, from the sensor 106. Gaze data may be indicative of a gaze direction in which the user 102 is viewing the point in the predetermined area. The determination of the gaze data based on the tracking of the eye and the head gradient of the user 102 has been described later in conjunction with FIGS. 4a, 4b, and 4c.

Based on the gaze data received from the sensor 106, the tracker unit 308 may be configured to determine the location of the point (being viewed by the user 102). The determination of the location of the point being viewed by the user 102 has been further described in conjunction with FIGS. 9a, 9b, and 9c. For example, if the user is viewing the indicia 114 printed on the object 112, the tracker unit 308 may determine the location of the point being viewed by the user 102 in the predetermined area. The location of the point in the predetermined area may correspond to the location of the indicia 114 in the predetermined area.

Figure 9A:
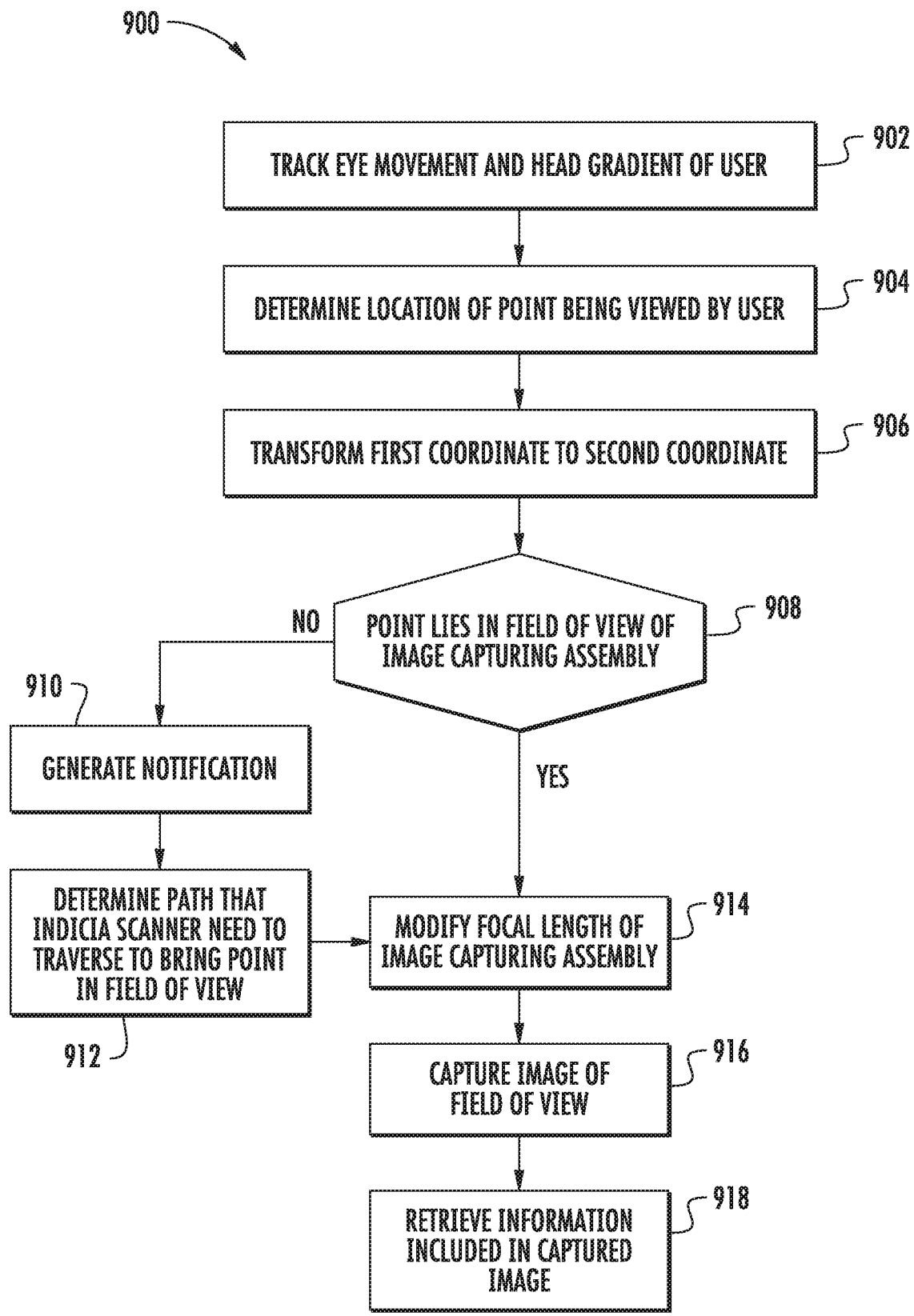
FIGS. 9a, 9b, and 9c illustrate flowcharts of a method for operating the indicia scanner, in accordance with the one or more embodiments described herein.
Figure 9B:
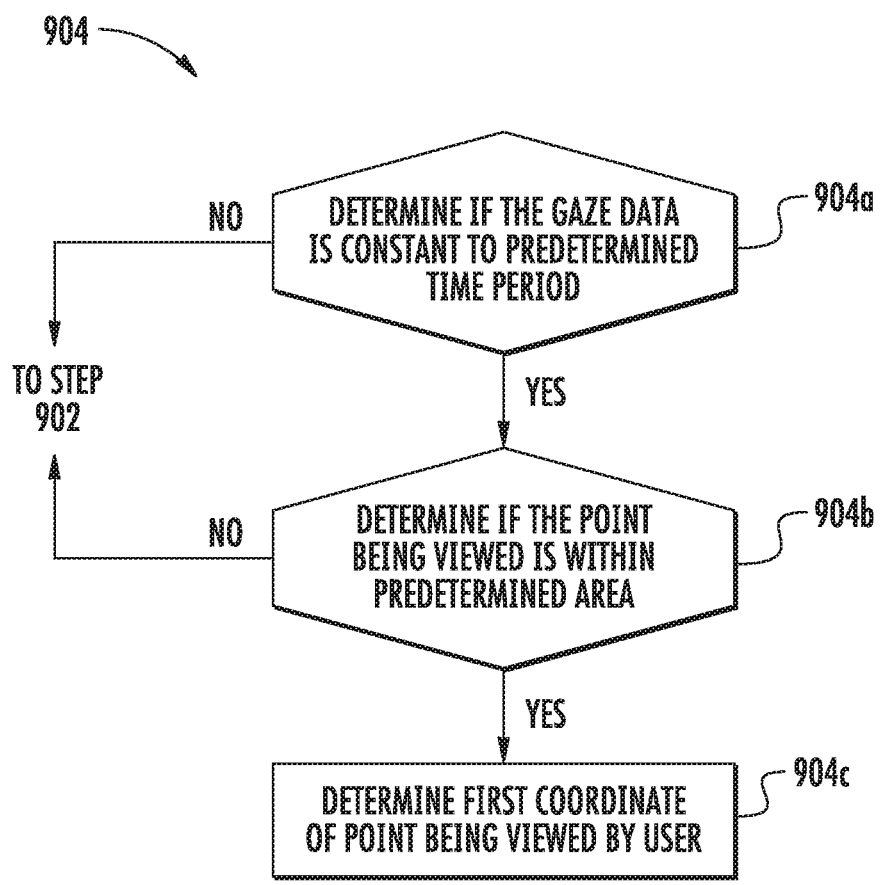
Figure 9C:
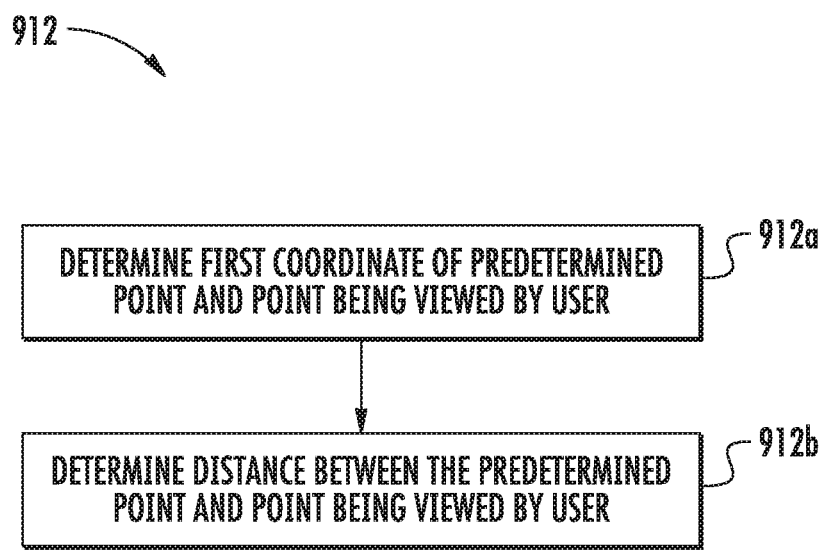

Further, the tracker unit 308 may be configured to determine the location of the point as the first coordinate in the first coordinate system, as is described in the FIGS. 9a, 9b, and 9c. As discussed, the first coordinate system may be utilized to define location of the one or more points the predetermined area. Further, the tracker unit 308 may be configured to store the information pertaining to the location of the point in the memory device 304.

The image processing unit 310 may include suitable logic and circuitry that may enable the control system 110 to at least control the operation of the image capturing assembly 108. In an example embodiment, the image processing unit 310 may be configured to retrieve the first coordinate of the point (defined in the first coordinate system) being viewed by the user 102 from the memory device 304. Thereafter, the image processing unit 310 may be configured to transform the first coordinate of the point to a second coordinate in a second coordinate system, as is described in conjunction with FIGS. 9a, 9b, and 9c. Further, the image processing unit 310 may be configured to instruct the image capturing assembly 108 to focus on the point represented by the second coordinate in the field of view, and accordingly capture an image that includes the focused point, as is described in FIGS. 9a, 9b, and 9c.

In an example embodiment, the image processing unit 310 may be further configured to retrieve the information from the captured image by applying one or more image processing techniques, as is described in conjunction with FIG. 9a. For example, if the user is viewing on the indicia 114, the image processing unit 310 may be configured to capture the image such that the indicia 114 is included in the captured image. Further, the image processing unit 310 retrieves the information from the indicia 114 by decoding the indicia 114. The operation of the image processing unit 310 has been described later in conjunction with FIGS. 4a, 4b, and, 4c, and FIGS. 9a, 9b, and 9c.

In an example embodiment, the controller 302 may be configured to control the operation of the various units of the control system 110. A person having ordinary skills in the art would appreciate that the scope of the disclosure is not limited to having separate units in the control system 110. In an example embodiment, each of the memory device 304, the transceiver 306, the tracker unit 308, and the image processing unit 310, may be embedded in the controller 302, itself. In such a scenario, the controller 302 may be configured to perform the operation of each unit in the control system 110.

FIGS. 4a, 4b, 4c, 9a, 9b, and 9c illustrate example flowcharts and example methods of the operations performed by an apparatus, such as the indicia scanner 104 having control system 110 of FIG. 1 in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4a, 4b, 4c, 9a, 9b, and 9c, when executed, convert a computer or processing circuitry into a particular machine configured to perform an example embodiment of the present invention. Accordingly, the operations of FIGS. 4a, 4b, 4c, 9a, 9b, and 9c define an algorithm for configuring a computer or processor, to perform an example embodiment. In some cases, a general purpose computer may be provided with an instance of the processor which performs the algorithm of FIGS. 4a, 4b, 4c, 9a, 9b, and 9c, to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 4a illustrates a flowchart 400 of a method for calibrating the indicia scanner 104, in accordance with one or more embodiments. At step 402, the indicia scanner 104 may include means, such as the control system 110 the tracker unit 308, and/or the like, for calibrating the sensor 106. The calibration of the sensor 106 has been further described in conjunction with FIG. 4b.

Referring to FIG. 4b and at step 402a, the indicia scanner 104 may include means, such as the sensor 106, the control system 110, the tracker unit 308, and/or the like, for defining the predetermined area. As discussed, the predetermined area may correspond to an area defined in the work area that may serve as a grid system, and/or a frame of reference for the sensor 106. To define the predetermined area, the user 102 may place one or more markings in the work area. The one or more markings may be defined by means of printed markings, LEDs, reflectors, and/or any other means that is visible to the user 102. In an example embodiment, the area encompassed by the one or more markings may correspond to the predetermined area. For example, the user 102 may place the one or more markings in a checkout lane in a retail environment.

Thereafter, the user 102 may position the indicia scanner 104 in the work area in such a manner that 100% of the predetermined area is encompassed in the field of view the image capturing assembly 108 of the indicia scanner 104. In an example embodiment, the user 102 may utilize a preview image of the field of view of the image capturing assembly 108 (displayed on a display screen (not shown) integrated with the indicia scanner 104) to position the indicia scanner 104. Subsequently, the user 102 may provide input on the indicia scanner 104 to capture an image of the work area in such a manner that the captured image includes the one or more markings. In an example embodiment, the tracker unit 308 may be configured to transmit the captured image to a computing device (not shown), where the captured image is displayed to the user 102. In some example embodiments, the tracker unit 308 may be configured to display the captured image to the user 102 on the display screen integrated on the indicia scanner 104. For the purpose of ongoing description, it is considered that the captured image is displayed on the display screen integrated with the indicia scanner 104.

In the captured image, the user 102 may provide input to select the one or more markings. In an example embodiment, the tracker unit 308 may be configured to receive the input from the user 102 through input devices (such as trigger button 210 and/or touch panel integrated on the display screen) on the indicia scanner 104 to select the one or more markings. In an example embodiment, the user 102 may select the one or more markings, in the captured image, a predetermined sequence. For example, the user 102 may provide the input to select a marking, of the one or more markings, that the user 102 wishes to be considered as an origin of the first coordinate system (that will be used to define the predetermined area, as discussed in conjunction with FIG. 1). On selection of the marking, the tracker unit 308 may be configured to associate the selected marking with the first coordinate (0,0) (i.e., the origin). Thereafter, the user 102 may provide the input to select other markings of the one or more markings. On selection of the other markings, the tracker unit 308 may be configured to automatically determine the first coordinates (not shown) associated with the other markings, based on the identified origin (i.e., the marking that was first selected by the user 102). In an example embodiment, the tracker unit 308 may be configured to determine the first coordinates associated with the other markings based on a distance between the other markings from the origin (0,0) in the captured image. In alternate embodiment, the first coordinates for the other markings may be inputted manually by the user 102. In such embodiment, the user 102 may provide input to select the marking and subsequently input the first coordinates of the selected marking. For instance, the user 102 may provide input to select a first marking of the one or more markings and subsequently input the first coordinates (2,3) for the first marking. Following table illustrates the one or more markings and the corresponding first coordinates:

TABLE 1 illustrating the one or more first coordinates associated with the one or more markings selected by the user 102.

| The one or more markings | First coordinates |
|---|---|
| Marking -1 | (0, 0) |
| Marking -2 | (5, 0) |
| Marking -3 | (0, 5) |
| Marking -4 | (5, 5) |
| Marking -5 | (2, 3) |

In an example embodiment, after selection of the one or more markings in the captured image, the user 102 may provide input on the indicia scanner 104 to select a set of markings of the one or more markings that define a periphery of the predetermined area. For example, referring to table 1, the user 102 may provide an input to select the marking-1, marking-2, marking-3, and marking-4 to define the periphery of the predetermined area. In an example embodiment, the remaining markings of the one or more markings are encompassed within the periphery of the predetermined area. For example, the marking-5 is encompassed within the predetermined area having periphery defined by the marking-1, marking-2, marking-3, and marking-4.

Additionally, the tracker unit 308 may be configured to instruct the depth sensor 220 determine a distance between the indicia scanner 104 and the predetermined area defined by the one or more markings. The determined distance corresponds to a threshold value of distance at which the field of view of the image capturing assembly 104 includes 100% of the predetermined area.

In an example embodiment, the tracker unit 308 may configured to store the information pertaining to the first coordinates of the one or more markings, the set of markings (defining the periphery of the predetermined area) of the one or more markings, and the threshold value of distance, in the memory device 304. Hereinafter, the one or more markings has been interchangeably referred to as one or more predetermined points.

After defining of the predetermined area, the user 102 need not position the indicia scanner 104 such that the field of view of the image capturing assembly 108 includes 100% of the predetermined area. The user 102 may position the indicia scanner 104 such that only a portion of the predetermined area is included in the field of view of the image capturing assembly 108.

At step 402b, the indicia scanner 104 may include means, such as a sensor 106, the control system 110, the tracker unit 308 and/or the like, for tracking the eye movement and head gradient of the user 102. In an example embodiment, the tracker unit 308 may be configured to track the eye movement and the head gradient of the user 102, through the sensor 106. Prior to tracking the eye movement of the user 102, the user 102 may hold the indicia scanner 104 in such a manner that the image capturing assembly 108 of the indicia scanner 104 is pointed away from the user 102 and the sensor 106 is pointed towards the user 102. Further, the user 102 may stand at the predetermined location in the work area from where the indicia scanner 104 is to be used to capture the one or more images.

In an example embodiment, the predetermined location in the work area may be defined in such a manner that when the user 102 is positioned at the predetermined location, the user 102 may be able to view the one or more predetermined points marked in the work area. As discussed above (step 402*a*), the one or more predetermined points may define a region in the work area within which the indicia scanner 104 is to be operated (e.g., the predetermined area). In some example embodiments, the indicia scanner 104 may be configured to capture the image of a complete and/or a portion of the region defined by the one or more predetermined points. Further, the location of the one or more predetermined points (i.e., the first coordinates defined in the step 402*a*) is stored in the memory device 304 of the indicia scanner 104.

It may be understood that the scope of the disclosure is not limited to the scenario where the user 102 holds the indicia scanner 104 at the predetermined location in the work area for purpose of calibration. In an alternate and/or additional embodiment, the indicia scanner 104 may be affixed at the predetermined location in the work area or may be movably positioned at the predetermined location in the work area. For example, the indicia scanner 104 may be positioned on a motorized platform or hub that may facilitate modification in the orientation of the indicia scanner 104 with respect to the ground surface of the work area.

In some example embodiments, the one or more predetermined points may be utilized to calibrate the sensor 106. To calibrate the sensor 106, the tracker unit 308 may instruct the user 102 to view at a first predetermined point of the one or more predetermined point. In an example embodiment, the tracker unit 308 may provide the instruction to the user 102 on the display screen integrated on the indicia scanner 104. For example, the tracker unit 308 may instruct the user 102 to view at the first predetermined point having the first coordinate as (0,0) (i.e., the origin of the first coordinate system). Concurrently, the sensor 106 to track eye movement and head gradient of the user 102, while the user 102 views the first predetermined point of the one or more predetermined points (marked in the work area). To track the eye movement of the user 102, the tracker unit 308 may instruct the sensor 106 to capture an image of a field of view of the sensor 106. As the sensor 106 is pointed towards the user 102 and the user 102 is in the field of view of the sensor 106, the sensor 106 captures the image of the user 102. Thereafter, the tracker unit 308 may be configured to apply one or more image processing techniques such as, but not limited to, Scale Invariant Feature Transform (SIFT), on the captured image to detect the head of the user 102 in the captured image.

Further, the tracker unit 308 may detect one or more features of the head of the user 102. The one or more features of the head of the user 102 may include, but are not limited to, eyes of the user 102, a periphery defining the periphery of the head of the user 102, and/or the like. Based on the position of the eyes and the periphery of the head of the user 102, the tracker unit 308 may determine the orientation of the head of the user 102 (i.e., the head gradient). For example, if the tracker unit 308 determines that the image captured by the sensor 106 includes only a single eye, the tracker unit 308 may determine that the user 102 may be looking sideways in a left direction or a right direction. In another example, if the image captured by the sensor 106 does not include eyes of the user 102, the tracker unit 308 may determine that either the user 102 is not present in the field of view of the sensor 106, or the user 102 is looking in some other direction. In such an example, the tracker unit 308 may be configured to generate an error signal indicating the tracking of the eye and the head gradient has failed. In response to generation of the error signal, the controller 302 may be configured to switch ON an LED on the indicia scanner 104. The user 102, on viewing the LED, may determine that the sensor 106 is unable to track her eyes. Accordingly, the user 102 may modify her head orientation or position such that the sensor 106 is able track to her eyes and head gradient.

After the detection of the eye of the user 102, the tracker unit 308 may instruct the sensor 106 to track the eye movement of the user 102. On receiving the instruction, the sensor 106 may be configured to identify a reflection point on a cornea of the eye by analyzing luminance at various points in the eye. The points where the value of the luminance of is greatest, when compared to other points of the eye, is considered as the reflection point on the cornea of the eye. In an example embodiment, the reflection point may indicate a relative position of a light source in the work area. Thereafter, the sensor 106 may be configured to determine a displacement vector from a central point of the cornea to the reflection point. To determine the displacement vector, the sensor 106 may be configured to generate two imaginary axis (X axis, and Y Axis) with central point of the cornea as the origin. Thereafter, the sensor 106 may be configured to determine a displacement magnitude between the central point (i.e, the origin) and the reflection point. Further, the sensor 106 may be configured to determine an angle between the X-axis (defined from the central point) and an imaginary line connecting the central point with the reflection point. In an example embodiment, the combination of the magnitude of displacement and the angle corresponds to the displacement vector. Further, the displacement vector central point may be indicative of the gaze direction of the user 102.

In an example embodiment, the displacement vector between the central point of the eye and the reflection point is transmitted as gaze data to the tracker unit 308. The gaze data is data, in some examples, that represents the displacement vector between the central point of the eye and the reflection point. Alternatively or additionally, the data may include other displacement vectors such as the displacement vector between the reflection point and other features of the eye such as, but not limited to, pupil of the eye, contour of the pupil, contour of the cornea, contour of limbus, and/or the like.

Alternatively or additionally, the tracker unit 308 may be configured to continuously track the displacement vector between the central point of the eye and the reflection point to provide a continuous stream of the gaze data to the tracker unit 308. This allows real time tracking of the eye movement of the user 102.

At step 402*c*, the indicia scanner 104 may include means, such as the sensor 106, the control system 110, the tracker unit 308, and/or the like, for determining whether the user 102 is viewing the first predetermined point of the one or more predetermined points for a predetermined time period. The tracker unit 308 may be configured to monitor the gaze data for the predetermined time period (e.g., 1 ms, 5 ms, 10 ms, and/or the like). If the gaze data is constant and does not change over the predetermined time period, the tracker unit 308 may determine that the user 102 is viewing the first predetermined point for the predetermined time period. Accordingly, the tracker unit performs the step 402*d*.

It may be understood that even when the user 102 views only the predetermined point, there may exist slight variations in the gaze data, for instance ±0.5 mm; ±0.5 degree. Therefore, to consider such slight variations, the tracker unit 308 may determine whether the displacement vector is within a tolerance range of gaze data. If the gaze data is within the tolerance range of gaze data, the tracker unit 308 may consider the gaze data to be constant.

On the other hand, if the tracker unit 308 detects variations in the gaze data exceeds the tolerance range of gaze data, the tracker unit 308 may determine that the user 102 may not have viewed the predetermined point for the predetermined time period. Accordingly, the tracker unit 308 repeats step 402*c*.

At step 402*d* indicia scanner 104 may include means, such as the sensor 106, the control system 110, the tracker unit 308, and/or the like, for correlating the gaze data with the location of the first predetermined point being viewed by the user 102. As discussed, the location of the first predetermined point is known (determined in the step 402*a*) and pre-stored in the memory device 304. Therefore, the tracker unit 308 may be configured to retrieve the location (i.e., the first coordinates) of the first predetermined point from the memory device 304. Thereafter, the tracker unit 308 may map the gaze data to the first coordinates of the first predetermined point.

For instance, from the gaze data, the tracker unit 308 is operable to determine that the displacement vector between the reflection point and the central point of the cornea of the eye is 10 mm and 30 degrees. Further, the tracker unit 308 determines that the first coordinates of the first predetermined point is (2,3). Accordingly, the tracker unit 308 maps 10 mm and 30 degrees (i.e., displacement vector obtained from the gaze data) with the first coordinate (2,3). If, after calibration, the tracker unit 308 determines from the gaze data that the displacement vector is 10 mm and 30 degrees, the tracker unit 308 determines that the user 102 is viewing the point at the location (2,3). Following table illustrates an example mapping between the location of the one or more predetermined points and the gaze data:

TABLE 2

Mapping between the First coordinates and the gaze data

| First coordinates of the one or more predetermined points | Gaze data |
| --- | --- |
| (0, 0) | 1 mm and 10 degrees |
| (0, 5) | 13 mm and −10 degrees |
| (5, 0) | 5 mm and 20 degrees |
| (5, 5) | 7 mm and 15 degrees |
| (2, 3) | 10 mm and 120 degrees |

In an example embodiment, based on the correlation between the first coordinates of the one or more predetermined points and the gaze data, the tracker unit 308 may be configured to determine a range of the location of the one or more predetermined points. In an example embodiment, the range of location of the one or more predetermined points define a coordinate range of the predetermined area. For example, from table 2, it can be observed that the range of the location of the one or more predetermined points is 0 to 5 is x direction and 0 to 5 in y direction. Therefore, the tracker unit 308 determines that the predetermined area extends between the coordinates 0 to 5 in x direction and 0 to 5 in y direction (i.e., coordinate range of the predetermined area). In an example embodiment, the range of location defines the first coordinate system that is used to represent the predetermined area. Further, the tracker unit 308 determine a range of gaze data from the mapping between the gaze data and the first coordinates associated with the one or more predetermined points. In an example embodiment, the range of gaze data corresponds to a range of displacement vector such that if the displacement vector determined from the gaze data (post calibration of the sensor 106) lies within the range of displacement vector, the tracker unit 308 determines that the user 102 is viewing at a point within the predetermined area. For example, the tracker unit 308 determines, from the table 2, that the range of gaze data as 1 mm to 10 mm displacement and −10 degrees to 120 degrees angle range.

In an example embodiment, the tracker unit 308 may be configured to repeat steps 402*b* through 402*d* for each of the one or more predetermined points in a predetermined order. The order of viewing the one or more predetermined points (during calibration of the sensor 106) may be predefined. In an example embodiment, the order may define which of the one or more predetermined points is to be viewed first and which of the one or more predetermined points is to be viewed second and so forth. For instance, the order of the viewing the one or more predetermined points may be such that the set of predetermined points defining the periphery of the predetermined area (identified by the set of markings) of the region in the work area are viewed first, thereafter, the remaining predetermined points within the region are viewed subsequently.

Referring back to FIG. 4*a*, at step 404, the indicia scanner 104 includes means such as, the control system 110, the image processing unit 310, and/or the like, for defining a second coordinate system to represent the field of view of the image capturing assembly 108. Prior to defining the second coordinate system, the user 102 may be configured to position the indicia scanner 104 in such a manner that a second predetermined point of the one or more predetermined points is within the field of view of the image capturing assembly 108.

In an example embodiment, the point in the field of view of the image capturing assembly 108 is selected in such a manner that the point is not part of the periphery of the predetermined area (for example, the point (2,3)). In an example embodiment, the user 102 may utilize an aimer (not shown) in the indicia scanner to position the indicia scanner 104 with respect to the second predetermined point of the one or more predetermined points. In an example embodiment, when the indicia scanner is positioned in such a manner that the second predetermined point of the one or more predetermined points is within the field of the view of the image capturing assembly 108, the indicia scanner 104 is said to be in a home position.

Once the indicia scanner 104 is in the home position, the image processing unit 310 may be configured to define the second coordinate system.

Referring to FIG. 4*c*, a flowchart 404 illustrates a method for defining the second coordinate system. At step 404*a*, the indicia scanner 104 includes means, such as the control system 110, the image processing unit 310, and/or the like, for determining a distance between the indicia scanner 104 and the predetermined point (which is within the field of view of the indicia scanner 104). In an example embodiment, the image processing unit 310 may utilize the depth sensor 220 in the image capturing assembly 108 to determine the distance. In an example embodiment, the distance between the indicia scanner 104 and the predetermined point corresponds to the distance between the predetermined area and the indicia scanner 104.

In some example embodiments, the distance between the predetermined area and the indicia scanner 104 may be deterministic of whether the complete predetermined area is included in the field of view of the image capturing assembly 108. For example, if the distance between the predetermined area and the indicia scanner 104 increases, this causes the field of view of the image capturing assembly 108 to include area beyond the predetermined area. On the contrary, if the distance between the predetermined area and the indicia scanner 104 decreases, this causes the field of view of the image capturing assembly 108 to include only a portion of the predetermined area.

At step 404b, the indicia scanner 104 includes means, such as the control system 110, the image processing unit 310, and/or the like, for determining whether the determined distance exceeds the threshold value of distance. As discussed above (in step 402a), the threshold value of distance may correspond to a distance at which the field of view of the image capturing assembly 108 includes complete predetermined area (i.e., 100% of the predetermined area is included in the field of the view. If the image processing unit 310 determines that the determined distance exceeds the threshold value of distance, the image processing unit 310 determines that the complete predetermined area is included in the field of view of the image capturing assembly 108. Accordingly, the image processing unit 310 may perform step 404c.

At step 404c, the indicia scanner 104 includes means, such as the control system 110, the image processing unit 310, and/or the like, for defining the second coordinate system to represent the field of view. In an example embodiment, to define the second coordinate system, the image processing unit 310 may be configured define a second coordinate for each point in the field of view from the perspective of the image capturing assembly 108. In an example embodiment, the image processing unit 310 may first define the second coordinate for the second predetermined point included in the field of view of the image capturing assembly 108. For instance, the image processing unit 310 may define the second coordinate of the second predetermined point as (0,0) (i.e., the origin). Thereafter, the image processing unit 310 may be configured to define the second coordinates for other points included in the field of view with reference to the second coordinates of the second predetermined point.

As the field of view includes the complete predetermined area, therefore, during defining of the second coordinates of the points included in the field of view of the image capturing assembly 108, the points of predetermined area are also defined in the second coordinate system.

At step 404d, the indicia scanner 104 includes means, such as the control system 110, the image processing unit 310, and/or the like, for mapping the second coordinates of the points in the field of view of the image capturing assembly 108 with the first coordinates of the points in the predetermined area. In an example embodiment, the image processing unit 310 may be configured to create a mapping table that includes first coordinates for each point in the predetermined area and corresponding second coordinates. An example mapping table is illustrated below:

TABLE 3 illustrating the mapping between the first coordinates of the points in the predetermined area and the second coordinates of the points in the predetermined area

| Points in the predetermined area | First coordinate system | Second coordinate system |
|---|---|---|
| First point | (5, 5) | (2, 2) |
| Second point | (5, 0) | (2, 0) |
| Third point | (0, 0) | (0, 0) |

From the mapping table illustrated above, it can be observed that first point has a first coordinate (5,5) and the second coordinate (2,2). The second coordinate (2,2) depicts the location of the first point in the field of view of the image capturing assembly 108.

Additionally or alternatively, at step 404e, the indicia scanner 104 includes means, such as the control system 110, the image processing unit 310, and/or the like, for determining a first mathematical relation between the first coordinate system and the second coordinate system. The first mathematical relation may be utilized by the image processing unit 310 to transform a first coordinate defined in the first coordinate system to a second coordinate in the second coordinate system. For example, the image processing unit 310 may determine a scale between the first coordinate system and the second coordinate system that may be used to transform the first coordinate in the first coordinate system to the second coordinate system. For instance, the scale between the second coordinate system and the first coordinate system is 1:2. In such a scenario, the (x, y) in the second coordinate system is represented by the coordinate (2x, 2y) in the first coordinate system. In an example embodiment, the image processing unit 310 may utilize one or more known technologies to define the first mathematical relation.

In some example embodiments, the first mathematical relation between the first coordinate system and the second coordinate system is not limited to scale. In an example embodiment, the first mathematical relation may include a transformation matrix that may be utilized to transform the first coordinate system to the second coordinate system. An example of the first mathematical relation that utilizes the transformation matrix has been illustrated as follows:

$$\begin{bmatrix} x_1^2 \\ y_1^2 \end{bmatrix} = \begin{bmatrix} f & 0 \\ 0 & f \end{bmatrix} * \begin{bmatrix} x_1^1 \\ y_1^1 \end{bmatrix} \qquad 1$$

Where,
$x_1^2$: X-coordinate of a point in second coordinate system;
$y_1^2$: Y Coordinate of a point in second coordinate system;

$$\begin{bmatrix} f & 0 \\ 0 & f \end{bmatrix}:$$

transformation matrix;
f: transformation factor;
$x_1^1$: X-coordinate of a point in first coordinate system; and
$y_1^1$: Y Coordinate of a point in first coordinate system.

In an example embodiment, the transformation factor may correspond to a numerical value, which may be utilized for transforming a first coordinate in the first coordinate system to a second coordinate in the second coordinate system. For example, the transformation factor may correspond to the scale between the first coordinate system and the second coordinate system.

If at step 404*b*, the image processing unit 310 determines that the distance between the predetermined area and the indicia scanner 104 is less than the threshold value of distance, the image processing unit 310 may determine that a portion of the predetermined area is included in the field of view of the image capturing assembly 108. Accordingly, the image processing unit 310 may perform the step 404*f*.

At step 404*f*, the indicia scanner 104 includes means, such as the control system 110, the image processing unit 310, and/or the like, for determining a percentage of the predetermined area included in the field of view, based on the distance between the indicia scanner 104 and the predetermined area and the threshold value of distance.

As discussed above, the percentage of the predetermined area included in the field of view is proportional to the distance between the indicia scanner 104 and the predetermined area. Therefore, to determine the percentage of the predetermined area included in the field of view of the image capturing assembly 108, the image processing unit 310 retrieves the threshold value of distance from the memory device 304. As discussed that at the threshold value of distance, the field of view include 100% of the predetermined area, therefore the image processing unit 310 may determine the percentage of the predetermined area based on the determined distance and the threshold value of distance. For example, if the determined distance between the indicia scanner 104 and the predetermined area is 5 meters and the threshold value of distance is 10 meters, the image processing unit 310 may determine that the 50% of the predetermined area is included in the field of view. Similarly, in another example, if the determined distance between the indicia scanner 104 and the predetermined area is 3 meters, the image processing unit 310 may determine that the 30% of the predetermined area is included in the field of view.

At step 404*g*, the indicia scanner 104 includes means, such as the control system 110, the image processing unit 310, and/or the like, for determining what portion of the predetermined area is included in the field of view of the image capturing assembly 108, when the indicia scanner 104 is in the home position (i.e., the first coordinates of a periphery of the portion of the predetermined area).

To determine the portion of the predetermined area, the image processing unit 310 may determine the first coordinates of the periphery of the portion of the predetermined area based on the percentage of the predetermined area, the first coordinate of the predetermined point, and the first coordinates of the set of predetermined points of one or more predetermined points defining the periphery of the predetermined area. As discussed above in step 402*a* the periphery of the predetermined area is defined by the set of predetermined points of the one or more predetermined points, therefore the first coordinates of the set of predetermined points are considered to be defining the periphery of the predetermined area. For example, the first coordinate of the predetermined point is (1,1), and the first coordinate of a point of the set of predetermined points (defining the periphery of the predetermined area) is (5,5). Assuming, 50% of the predetermined area is included in the field of view, the image processing unit 310 may determine that the point (3,3) constitutes the periphery of portion of the predetermined area in the field of view. Similarly, the image processing unit 310 may be configured to identify other points that constitute the portion of the predetermined area included in the field of view.

At step 404*h*, the indicia scanner 104 includes means, such as the control system 110, the image processing unit 310, and/or the like, for defining a second coordinate for each point in the portion of the predetermined area. In an example embodiment, the image processing unit 310 may employ similar methodology as described in the step 404*c*, 404*d* and 404*e* to define the second coordinate for each point in the portion of the predetermined area. Additionally, the image processing unit 310 may be configured to define the second coordinate (in the second coordinate system) for the points in the predetermined area that are not included in the field of view by extrapolating the second coordinates determined for the points included in the field of view of the image capturing assembly 108.

Additionally or alternately, the image processing unit 310 may be configured to determine a second mathematical relation that may be configured to transform the first coordinate in the first coordinate system to the second coordinate system. In an example embodiment, the image processing unit 310 may be configured to utilize similar methodology as described in the step 404*e* to define the second mathematical relation.

In some examples, the scope of the disclosure is not limited to only utilizing the determined distance between the indicia scanner 104 and the predetermined area to determine whether field of view of the image capturing assembly 108 completely encompasses the predetermined area. In an example embodiment, the image processing unit 310 may further consider one or more parameters associated with the image capturing assembly 108 to determine whether field of view of the image capturing assembly 108 completely includes the predetermined area. For example, the image processing unit 310 may utilize a zoom value of image capturing assembly 108 to determine whether the field of view includes the predetermined area.

Figure 5:
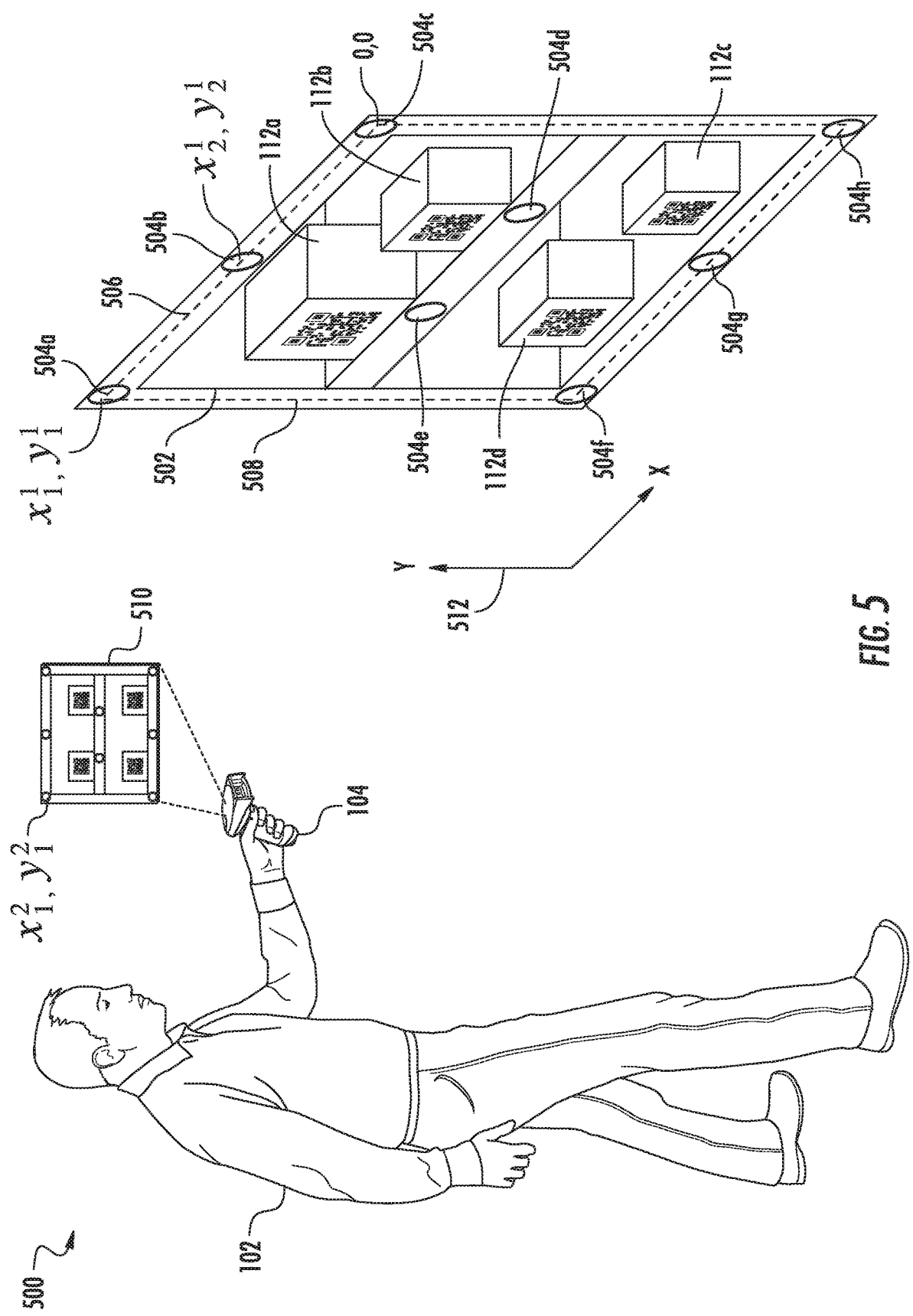
FIG. 5 illustrates example calibration of a sensor and an image capturing assembly, in the indicia scanner, in accordance with one or more embodiments described herein.

FIG. 5 illustrates example calibration of sensor 106 and the image capturing assembly 108, in accordance with one or more embodiments described herein. The exemplary method 500 depicts the user 102 holding the indicia scanner 104. The indicia scanner 104 is pointed towards to a rack 502 that includes one or more objects 112*a*, 112*b*, and 112*c*. Each of the one or more objects 112*a*, 112*b*, and 112*c* has the indicia 114. Further, the rack 502 has one or more markings (504*a*, 504*b*, 504*c* . . . 504*h*) that correspond to the one or more predetermined points. As discussed above, the location of each of the one or more predetermined points (depicted by 504*a*, 504*b*, 504*c* . . . 504*h*) are known to the tracker unit 308 in the indicia scanner 104 (as discussed in the step 402*a*).

During calibration, the user 102 may view a predetermined point (for example, the point 504*a*) of the one or more predetermined points (depicted by 504*a*, 504*b*, 504*c* . . . 504*h*). The sensor 106 may be configured to track the eye movement and the head gradient of the user 102 to determine the gaze data. Thereafter, the tracker unit 308 may be configured to correlate the gaze data with the location of the one or more predetermined points (depicted by 504*a*, 504*b*, 504*c* . . . 504*h*). Further, the steps are repeated for each point of the one or more predetermined points (depicted by 504*a*, 504*b*, 504*c* . . . 504*h*) in the predetermined order. For example, the user 102 may view the predetermined point 504*b* after viewing of the predetermined point 504*a*.

Further, the tracker unit 308 may be configured to define the predetermined area (depicted by 506) within which the sensor 106 may be configured to determine the location of the point being viewed by the user 102. In an example embodiment, the plane of the predetermined area is same as the plane of the rack 502. In an example embodiment, the one or more predetermined points (depicted by 504a, 504b, 504c . . . 504h) may define a periphery (depicted by 508) of the predetermined area 506. Further, the tracker unit 308 represents the predetermined area (depicted by 506) in the first coordinate system (depicted by 512). For example, the location of the one or more predetermined points is defined in the first coordinate systems. From FIG. 5, it can be observed that the point 504a is has a coordinate $(x_1^1,y_1^1)$, while the point 504b has a coordinate $(x_1^2,y_1^2)$. Further, it can be observed that the point 504c corresponds to the origin of the predetermined area (depicted by 506), i.e., the point 504c has a coordinate (0,0).

In some examples, the scope of the disclosure is not limited to the first coordinate system 512 being a 2-Dimensional (2-D) coordinate system. In an example embodiment, the predetermined area (depicted by 506) may be represented by a 3-Dimensional (3-D) coordinate system. In such a scenario, for example, the point 504a may be represented by the coordinate $(x_2^1,y_2^1,z_2^1)$. In yet another embodiment, the predetermined area (depicted by 506) may be represented in other types of coordinate systems, without departing from the scope of the disclosure.

Further, the exemplary method 500 includes an image (depicted by 510) that depicts the field of view of the imaging capturing assembly 108. It can be observed from the image 510 that the predetermined area (depicted by the 506) is included in the field of view of the imaging capturing assembly 108. Further, it can be observed that each of the one or more predetermined points (depicted by 504a, 504b, 504c . . . 504h) is included in the field of view of the imaging capturing assembly 108. As complete predetermined area is included in the field of view, the imaging processing unit 310 may be configured to define the second coordinate, in the second coordinate system, for each point in the predetermined area. For example, it can be observed that the predetermined point (depicted by 504a) is represented by the second coordinate $(x_1^2,y_1^2)$, in the second coordinate system.

Figure 6:
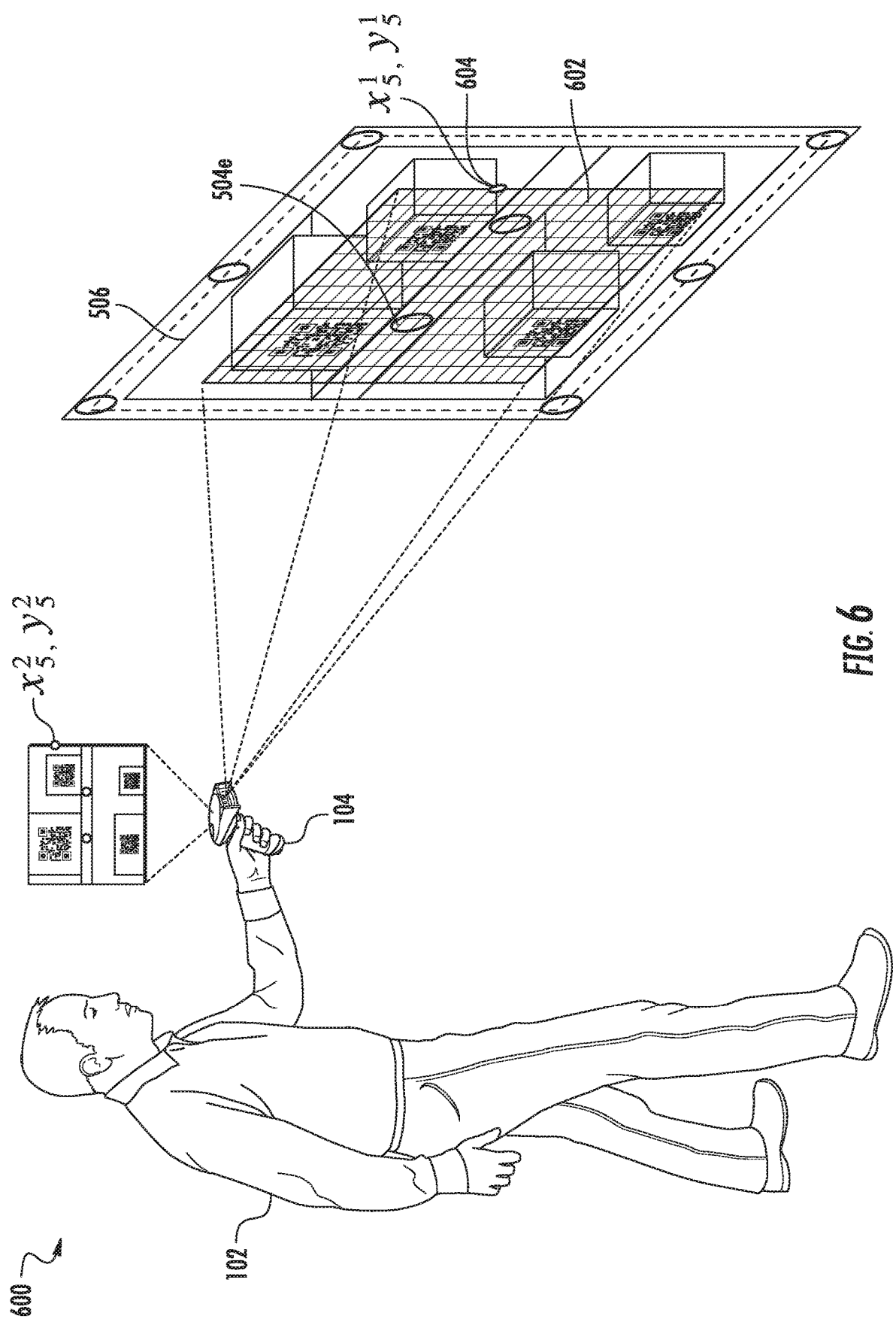
FIG. 6 illustrates another and/or additional example calibration of a sensor and an image capturing assembly, in the indicia scanner, in accordance with one or more embodiments described herein.

FIG. 6 illustrates example calibration of sensor 106 and the image capturing assembly 108, in accordance with one or more embodiments. The exemplary method 600 has been described in conjunction with FIGS. 1, 2, 3, 4, and 5.

It can be observed from the exemplary method 600 that the user 102 is standing close to the predetermined area (depicted by 506) in comparison to the position of the user 102 depicted in the exemplary method 500. Due to change in position of the user 102, the field of view of the image capturing assembly 108 changes. It can be observed that the field of view includes a portion (depicted by 602) of the predetermined area (depicted by 506). Further, it can be observed that the portion (depicted by 602) makes 50% of the predetermined area (depicted by 506).

Further, as discussed, the image processing unit 310 may identify the first coordinates (in the first coordinate system) of the points that constitute the periphery of the portion 602 of the predetermined area (depicted by 506), based on the coordinate of the predetermined point (depicted by 504e), and the determined percentage of the predetermined area (i.e., 50% as illustrated in the exemplary method 600). For instance, the image processing unit 310 determines that the point represented by the coordinate $(x_5^1,y_5^1)$ (depicted by 604) is included in periphery of the portion 602 of the predetermined area (depicted by 506).

Further, it can be observed from FIG. 6, that for each point included in the portion 602 of the predetermined area (depicted by 506), the second coordinate in the second coordinate system is defined. The second coordinate represents the location of the point in the field of view of the image capturing assembly 108. For example, the second coordinate of the point 604 is $(x_5^2,y_5^2)$.

Although, as depicted in the exemplary method 500 and 600, the user 102 holds the indicia scanner 104 to perform the calibration operation. However, the scope of the disclosure is not limited to performing the calibration operation with user 102 holding the indicia scanner 104. In an example embodiment, as described above, the indicia scanner 104 may be affixed at the predetermined location such that the image capturing assembly 108 is pointed towards the predetermined area (depicted by 506), while the sensor 106 is pointed towards the user 102. One such scenario has been illustrated in FIG. 7. In yet another embodiment, the indicia scanner 104 may be positioned on a movable hub that may be configured to modify pan and tilt of the indicia scanner 104. One such scenario has been depicted in FIG. 8.

Referring to FIG. 7 another example calibration of sensor 106 and image capturing assembly 108, is illustrated in accordance with one or more embodiments. From the exemplary method 700, it can be observed that the indicia scanner 104 is affixed at the predetermined location 702. Further, it can be observed that the indicia scanner 104 is affixed in such a manner that the image capturing assembly aligns with the predetermined point 504e. Furthermore, it can be observed that the user 102 is positioned behind the affixed indicia scanner 104. In an example embodiment, in the exemplary method 700, the indicia scanner 104 is affixed in such a manner that the complete predetermined area (depicted by 506) is included in the field of view of the image capturing assembly 108 (depicted by the image 704).

Figure 8:
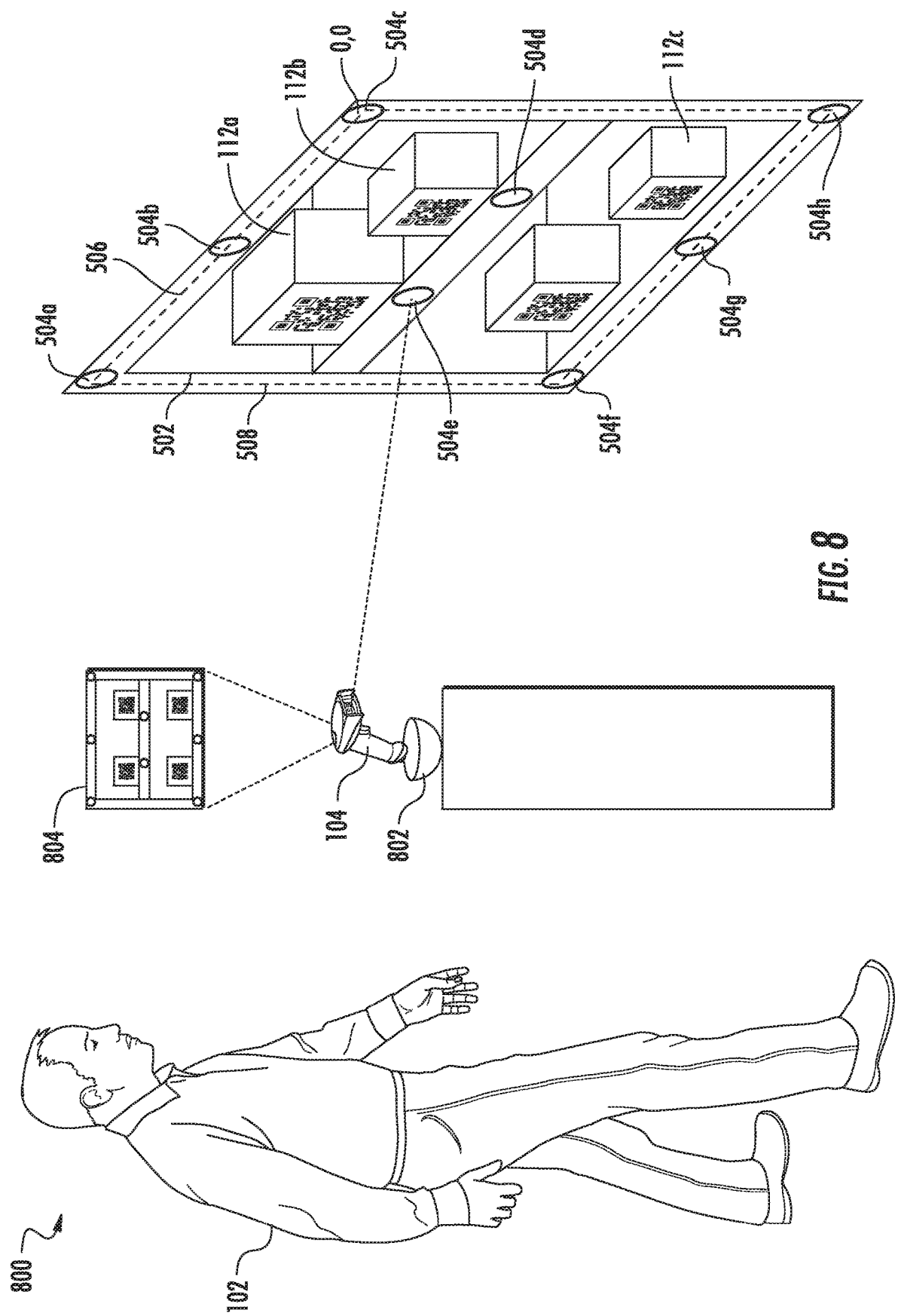
FIG. 8 illustrates yet another and/or additional example calibration of a sensor and an image capturing assembly, in the indicia scanner, in accordance with one or more embodiments described herein.

Referring to FIG. 8, yet another example calibration of sensor 106 and the image capturing assembly 108, is illustrated in accordance with one or more embodiments. From the exemplary method 800, it can be observed that the indicia scanner 104 is positioned on a movable hub 802. The movable hub 802 may correspond to a motorized platform that may be configured to modify orientation of the indicia scanner 104 coupled to it. For example, the movable hub 802 may modify the pan and tilt of the indicia scanner 104. In an example embodiment, the movable hub 802 may include one or more electrical motors that may be actuated based on a control signal received from the controller 302.

Further, it can be observed from FIG. 8 that the movable hub 802 has been configured in such a manner that the indicia scanner 104 mounted on the movable hub 802 aligns with the predetermined point 504e. As discussed above, the position where indicia scanner 104 aligns with the predetermined point 504e corresponds to the home position. The controller 302 may be configured to store the pan and tilt value of the indicia scanner 104 corresponding to the home position of the indicia scanner 104. In the exemplary method 800, the indicia scanner 104 (mounted on the movable hub 802) is positioned in such a manner that the complete predetermined area (depicted by 506) is included in the field of view of the image capturing assembly 108 (depicted by the image 804).

FIG. 9a illustrates a flowchart 900 of a method for operating the indicia scanner 104, in accordance with the one or more embodiments. The flowchart 900 has been described in conjunction with FIGS. 1, through 8.

At step 902, the indicia scanner 104 includes means, such as the control system 110, the tracker unit 308, and/or the like, for tracking the eye movement and the head gradient of the user 102. In an example embodiment, the tracker unit 308 may be configured to track the eye movement and the head gradient of the user 102 through the sensor 106. In an example embodiment, prior to tracking the eye movement and the head gradient, the user 102 may be configured to position the indicia scanner 104 in the home position (i.e., the indicia scanner 104 is aligned with the second predetermined point). Thereafter, the eye movement and the head gradient user 102 is tracked by the indicia scanner 104.

Tracking the eye movement and the head gradient includes, receiving, by the tracker unit 308, the gaze data from the sensor 106. In an example embodiment, the tracker unit 308 may employ similar methodologies as described in the step 402a to track the eye movement and the head gradient of the user 102.

At step 904, the indicia scanner 104 includes means, such as the control system 110, the tracker unit 308, and/or the like, for determining the location of the point being viewed by the user 102 based on the gaze data. The determination of the location of the point being viewed by the user 102 has been described in conjunction with FIG. 9b.

Referring to FIG. 9b, at step 904a, the indicia scanner 104 includes means, such as the control system 110, the tracker unit 308, and/or the like, for determining whether the gaze data is constant for the predetermined time period. As discussed, the gaze data includes information pertaining to the displacement vector between the reflection point and the central point of the cornea of the eye, therefore, the tracker unit 308 may be configured to determine whether the displacement vector is constant for the predetermined time period. It may be understood that even when the user 102 views only the point, there may exist slight variations in the gaze data, for instance ±0.5 mm; ±5 degrees angle. Therefore, to consider such slight variations, the tracker unit 308 may determine whether the distance is within the tolerance range of distance (also referred to as the tolerance range of gaze data).

If the distance in the gaze data is within the tolerance range of distance, the tracker unit 308 may consider the gaze data to be constant. If the gaze data is constant and does not change over the predetermined time period, the tracker unit 308 may determine that the user 102 is viewing a point. Accordingly, the tracker unit performs the step 904b. However, if the tracker unit 308 detects variations in the gaze data (that exceeds the tolerance range of gaze data), the tracker unit 308 may determine that the user 102 may not be viewing the point. Accordingly, the tracker unit 308 may repeat the step 904.

At step 904b, the indicia scanner 104 includes means, such as the control system 110, the tracker unit 308, and/or the like, for determining whether the point being viewed by the user 102 is within the predetermined area. To determine whether the point being viewed by the user 102 is within the predetermined area, in an example embodiment, the tracker unit 308 may be configured to check whether the gaze data (determined in step 902) lies in the range of the gaze data (determined in step 402). If the tracker unit 308 determines that the determined gaze data lies in the range of gaze data, the tracker unit 308 may determine that the point being viewed by the user 102 lies in the predetermined area. For instance, if the tracker unit 308 determines that the gaze data is 5 mm displacement and −10 degree angle, based on the range of gaze data determined from the table 2 (i.e., 1 mm to 10 mm displacement and −10 degrees to 120 degrees angle range), the tracker unit 308 determines that the determined gaze data is within the range of gaze data. Accordingly, the tracker unit 308 determines that the user 102 is viewing the point within the predetermined area.

If the tracker unit 308 determines that the user 102 is viewing at the point within the predetermined area, the tracker unit 308 may perform the step 904c. However, if the tracker unit 308 determines that the determined gaze data lies outside the range of gaze data, the tracker unit 308 determines that the point being viewed by the user 102 lies outside the predetermined area. Accordingly, the tracker unit 308 repeats the step 902.

Additionally, or alternately, the tracker unit 308 may be configured to generate an error signal in response to determining that the point being viewed by the user 102 lies outside the predetermined area. In response to the generation of the error signal, the controller 302 may be configured to activate a Light Emitting Diode (LED) on the indicia scanner 104 to indicate that the sensor 106 is unable to detect the point being viewed by the user 102.

At step 904c, the indicia scanner 104 includes means, such as the control system 110, the tracker unit 308, and/or the like, for determining the first coordinate of the point being viewed by the user 102. To determine the first coordinates of the point being viewed by the user 102, the tracker unit 308 may utilize the mapping between the gaze data and the location (i.e., the first coordinates) of the one or more predetermined points (determined in step 402a). For example, referring to table 2, the tracker unit 308 may determine that for the gaze data 5 mm and 20 degrees angle, the first coordinates of the point being viewed by the user 102 is (5,0).

Referring back to FIG. 9a, at step 906, the indicia scanner 104 includes means, such as the control system 110, the image processing unit 310, and/or the like, for transforming the first coordinate of the point (being viewed by the user 102) to the second coordinate in the second coordinate system. In an example embodiment, the image processing unit 310 may be configured to transform the first coordinate in the first coordinate system to the second coordinate in the second coordinate system by using the mapping table (for example table 3) determined in the step 404d. In alternate embodiment, to perform the transformation, the image processing unit 310 may be configured to utilize the mathematical relation between the first coordinate system and the second coordinate system (defined in step 404). For example, if the tracker unit determines that the location of the point being viewed by the user 102 is $(x_6^1, y_6^1)$, the image processing unit 310 may determine that the second coordinate of the point is $(x_6^2, y_6^2)$, based on the transformation of the first coordinate to the second coordinate.

At step 908, the indicia scanner 104 includes means, such as the control system 110, the image processing unit 310, and/or the like, for determining whether the point (represented by the second coordinate) lies in the field of view of the image capturing assembly 108. To determine whether the point (represented by the second coordinate) lies in the field of view, the image processing unit 310 determines the percentage of the predetermined area included in the field of view of the image capturing assembly 108, using similar methodologies described in the step 404f. If the percentage is 100%, the image processing unit 310 may be configured to determine that the point represented by the second coordinate is present in the field of view of the image capturing assembly 108. Thereafter, the image processing unit 310 may be configured the perform the step 914.

If the percentage of the predetermined area is not 100%, the image processing unit 310 may be configured to compare the second coordinate of the point being viewed by the user 102 with the second coordinate of the second predetermined point (i.e., the point included in the field of view of the image capturing assembly 108 at home position), and the second coordinate of the set of predetermined points defining the periphery of the field of view of the image capturing assembly 108 (i.e., the second coordinates of the one or more points defining the periphery of the portion of the predetermined area). For example, the second coordinate of the point being viewed by the user 102 is (−2, −2). Further, the second coordinate of the predetermined point is (0,0) and the second coordinate of one of the point defining the periphery of the field of view is (−1, −1). Therefore, the image processing unit 310 may determine that the point being viewed by the user 102 is not present in the field of view of the image capturing assembly 108, as the second coordinate of the point being viewed by the user 102 (i.e., −2, −2) lies beyond the point defining the periphery of the field of view (i.e., the point having the second coordinate (−1, −1)). If the image processing unit 310 determines that the point being viewed by the user 102 lies beyond the field of the image capturing assembly 108, the image processing unit 310 may perform the step 910. If the image processing unit 310 determines that the point being viewed by the user 102 does not lie beyond the field of view of the image capturing assembly 108, the image processing unit performs the step 914.

At step 910, the control system may include means, such as the image processing unit 310, for generating a notification. In an example embodiment, the notification may be indicative of the point being viewed by the user 102 not included in the field of view of the image capturing assembly 108 (as determined in the step 908). In response to the generation of the notification, the controller 302 may be configured to activate the LED that may be indicate to the user 102 that the point being viewed is not included in the field of view of the image capturing assembly 108.

Additionally or alternatively, at step 912, the indicia scanner 104 includes means such as, the control system 110, the image processing unit 310, and/or the like, for determining a path that the indicia scanner 104 has to traverse to bring the point being viewed by the user 102 in the field of view of the image capturing assembly 108. In an example embodiment, the controller 302 may be configured to determine the path. The determination of the path to be traversed by the indicia scanner 104 has been further described in conjunction with FIG. 9c.

Referring to FIG. 9c, at step 912a, the indicia scanner 104 includes means such as, the control system 110, the controller 302, and/or the like, for determining the first coordinates of the predetermined point (currently included in the field of view of the image capturing assembly 108) and the first coordinate of the point being viewed by the user 102.

At step 912b, the indicia scanner 104 includes means such as, the control system 110, the controller 302, and/or the like, for determining a distance between the predetermined point and the point being viewed by the user 102, based on the first coordinates of the predetermined point and the first coordinates of the point being viewed by the user 102. For instance, the controller 302 may be configured to determine the distance in both x-direction and y-direction. For instance, if the first coordinates of the predetermined point are (5,6) and the first coordinate of the point being viewed by the user 102 is (3,8), the controller 302 may be configured to determine the distance as −2 in x-direction and 2 in y direction. In an example embodiment, the determined distance may be indicative of the path that indicia scanner 104 needs to traverse in order to bring the point being viewed by the user 102 in the field of view of the image capturing assembly 108. It may be noted that in coordinate system, the "−" sign may indicate a direction in which the indicia scanner 104 is to be traversed. For instance, −2 in x-direction may indicate that the indicia scanner 104 is to be traversed along the x axis in the left direction to the predetermined point. Similarly, the −2 in y direction may indicate that the indicia scanner 104 is to be traversed along the y axis in the downward direction from the predetermined point.

In some example embodiments and based on the determined path, the controller 302 may be configured to display the path on a display device (not shown) associated with the indicia scanner 104. The display of the path may guide the user 102 to move the indicia scanner 104 along the path to a position such that the point being viewed by the user 102 is included in the field of view of the image capturing assembly 108.

In some examples, the scope of the disclosure is not limited to displaying the path on the display device on the indicia scanner 104. In an example embodiment, the indicia scanner 104 may include one or more LEDs that may represent direction in which the indicia scanner 104 needs to be traversed. For example, a LED representing the "RIGHT" direction may be positioned in the housing 202 of the indicia scanner 104. Further, LEDs representing the "UP", "LEFT", and "DOWN" direction may be placed on the housing 202 of the indicia scanner 104. The controller 302, on determining the path, may be configured to activate the one or more LEDs in a predetermined pattern to indicate the path.

In some examples, the scope of the disclosure is not limited to the controller 302 displaying the path either on the display device or on through the one or more LEDs. In an example embodiment, the controller 302 may be configured to transform the determined distance, between the predetermined point and the point being viewed by the user, to a pan and a tilt value that the indicia scanner 104 is required to have to bring the point being viewed by the user 102 in the field of view of the image capturing assembly 108. In the scenario, where the indicia scanner 104 is mounted on the movable hub, the controller 302 may be configured to actuate the motors to modify the pan and tilt of the indicia scanner 104 to the determined pan and tilt value. The modification in pan and tilt of the indicia scanner 104 has been described in conjunction with FIG. 11.

At step 914, the indicia scanner 104 includes means such as, the control system 110, the image processing unit 310, and/or the like, for modifying the focal length of the image capturing assembly 108 to focus on the point being viewed by the user 102. As discussed in conjunction with the steps 906 and 908, the point being viewed by the user 102 is included in the field of view of the image capturing assembly 108 and the image processing unit 310 has determined the location of the point being viewed by the user 102 in the field of view of the image capturing assembly 108 (i.e., the second coordinate). Based on the determined second coordinate, the image processing unit 310 may be configured to focus on the point represented by the second coordinate. In an example embodiment, prior to focusing on the point being viewed by the user 102, the image processing unit 310 may be configured to instruct the depth sensor 220 in the image capturing assembly 108 to determine a distance between the indicia scanner 104 and the point being viewed by the user 102. Thereafter, based on the determined distance, the image capturing assembly 108 may be configured to focus on the point being viewed by the user 102.

In alternate embodiment, where the first coordinate of the point being viewed by the user 102, is 3-D coordinate, the image processing unit 310 may utilize the z-direction value of the coordinate to determine the distance between the indicia scanner 104 and the point being viewed by the user 102. Thereafter, the focus operation is performed. In an example embodiment, the modified focal length corresponds to a second focal length of the image capturing assembly 108.

In an example embodiment, during the focusing on the point being viewed by user 102, a predetermined region around the point is also focused. Such region has been referred to as the focused region.

At step 916, the indicia scanner 104 includes means such as, the control system 110, the image processing unit 310, and/or the like, for capturing the image of the field of view. As the point being viewed by the user 102 is focused in the field of view of the image capturing assembly 108, the captured image includes the point being viewed by the user. Further, the point being by the user 102 is focused in the captured image. In an example embodiment, the image processing unit 310 may capture the image of the field of view based on a trigger input provided by the user 102. In an example embodiment, the user 102 may provide the trigger input by pushing the trigger button 210 positioned in the housing 202 of the indicia scanner 104. In alternate embodiment, the indicia scanner 104 may include an audio input device such as a microphone that may be configured to receive voice input from the user 102. Based on the voice input, the controller 302 may generate the trigger signal to capture the image of the field of view.

In some examples, the scope of the disclosure is not limited focusing only the point being viewed by the user 102. In an example embodiment, the image capturing assembly 108 may focus a predetermined region in vicinity of the point. Hereinafter, such regions have been referred to as focused region.

At step 918, the indicia scanner 104 includes means such as, the control system 110, the image processing unit 310, and/or the like, for retrieving the information included in the captured image. In an example embodiment, the image processing unit 310 may be configured to retrieve the information from the focused region of the captured image. As discussed in step 912, the focused region in the captured image includes the point being viewed by the user 102.

For instance, the focused region includes an indicia, the image processing unit 310 may be configured to decode the indicia to retrieve the information encoded in the indicia. In another example, if the focused information includes text, the image processing unit 310 may be configured to retrieve the text from the captured image.

Figure 10:
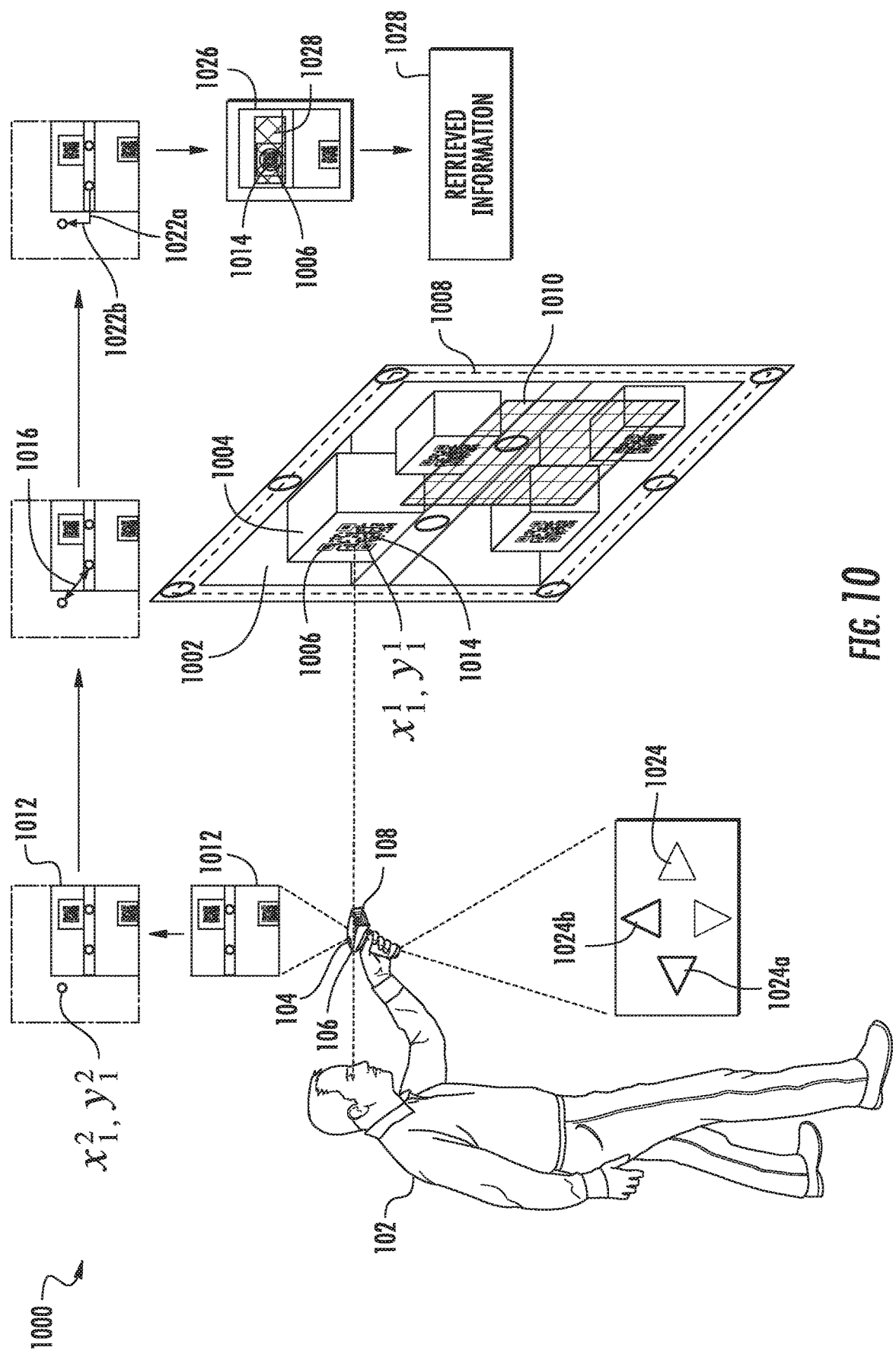
FIG. 10 illustrates example operation of the indicia scanner, in accordance with one or more embodiments described herein.

FIG. 10 illustrates an example operation of the indicia scanner 104, in accordance with one or more embodiments. The exemplary method 1000 has been described in conjunction with FIG. 1 through 9.

The exemplary method 1000 illustrates the user 102 holding the indicia scanner 104 in such a manner that the sensor 106 is pointed towards the user 102 and the image capturing assembly 108 is pointed towards a rack 1002. Further, it can be observed that the rack 1002 includes one or more objects 1004, each having a printed indicia 1006. Furthermore, the exemplary method 1000 illustrates the predetermined area 1008 defined in the plane of the rack 1002. Additionally, the exemplary method 1000 depicts that the portion 1010 of the predetermined area 1008 is included in the field of view 1012 of the image capturing assembly 108.

For the purpose of the describing the exemplary method 1000, it assumed that the user 102 views the indicia 1006 printed on the object 1004. The sensor 106 tracks the eye movement of the user 102 to determine that a point 1014 being viewed by the user 102 (a described in step 904). Further, the sensor 106 determines the location (depicted by $x_1^1, y_1^1$) of the point 1014. In an example embodiment, the location of the point 1014 is indicative of the location of the indicia 1006 in the predetermined area 1008.

Thereafter, the location (depicted by $x_1^1, y_1^1$) of the point 1014 is transformed to a second coordinate (depicted by $x_1^2, y_1^2$) in the second coordinate system (utilized to define the field of view 1012). As depicted, the second coordinate (depicted by $x_1^2, y_1^2$) of the point 1014 lies outside the field of view 1012 of the image capturing assembly 108.

On determining that the second coordinate (depicted by $x_1^2, y_1^2$) of the point 1014 lies outside the field of view 1012, the image processing unit 310 determines a distance (depicted by 1016) between the second coordinate of the predetermined point 1018 (included in the field of view 1012 when the indicia scanner 104 is in the home position) and the second coordinate (depicted by $x_1^2, y_1^2$) of the point 1014. Further, based on the determined distance (depicted by 1016), the image processing unit 310 is configured to determine a path (depicted by 1020) that the indicia scanner 104 needs to traverse to bring the point 1014 indicated by the second coordinate (depicted by $x_1^2, y_1^2$) in the field of view 1012 of the image capturing assembly 108. From the exemplary method 1000 it can be observed that the path 1020 is depicted by one or more directions (depicted by 1022a and 1022b) in which the indicia scanner 104 has to be traversed.

Further, it can be observed that the one or more LEDs (depicted by 1024) corresponding to determined directions (depicted by 1022a and 1022b) are activated. The LED indicating the Left direction (depicted by 1024a) and the LED indicating the UP direction (depicted by 1024b) are activated. The activated LEDs (depicted by 1024) guides the user to traverse the indicia scanner 104 along the path 1020.

Once the user 102 has moved the indicia scanner 104 along the path 1020, the point 1014 depicted by the second coordinate (depicted by $x_1^2, y_1^2$) is included in the field of view 1012. Thereafter, the image processing unit 310 instructs the image capturing assembly to focus on the point 1014 depicted by the second coordinate (depicted by $x_1^2, y_1^2$) and accordingly capture the image 1026 that includes the focused point 1014. As discussed, the focusing the point 1014 includes focusing a region (depicted by 1028) in proximity to the point 1014. Further, from the captured image 1026 it can be observed that the focused region depicted by 1028 includes the point 1014.

As discussed, the point 1014 corresponds to the location of the indicia 1006 being viewed by the user 102, therefore, in the captured image 1026, the focused region 1028 includes the image of the indicia 1006. The image processing unit 310 may be configured to decode the indicia 1006 to retrieve the information from the indicia 1006 (depicted by 1030).

Figure 11:
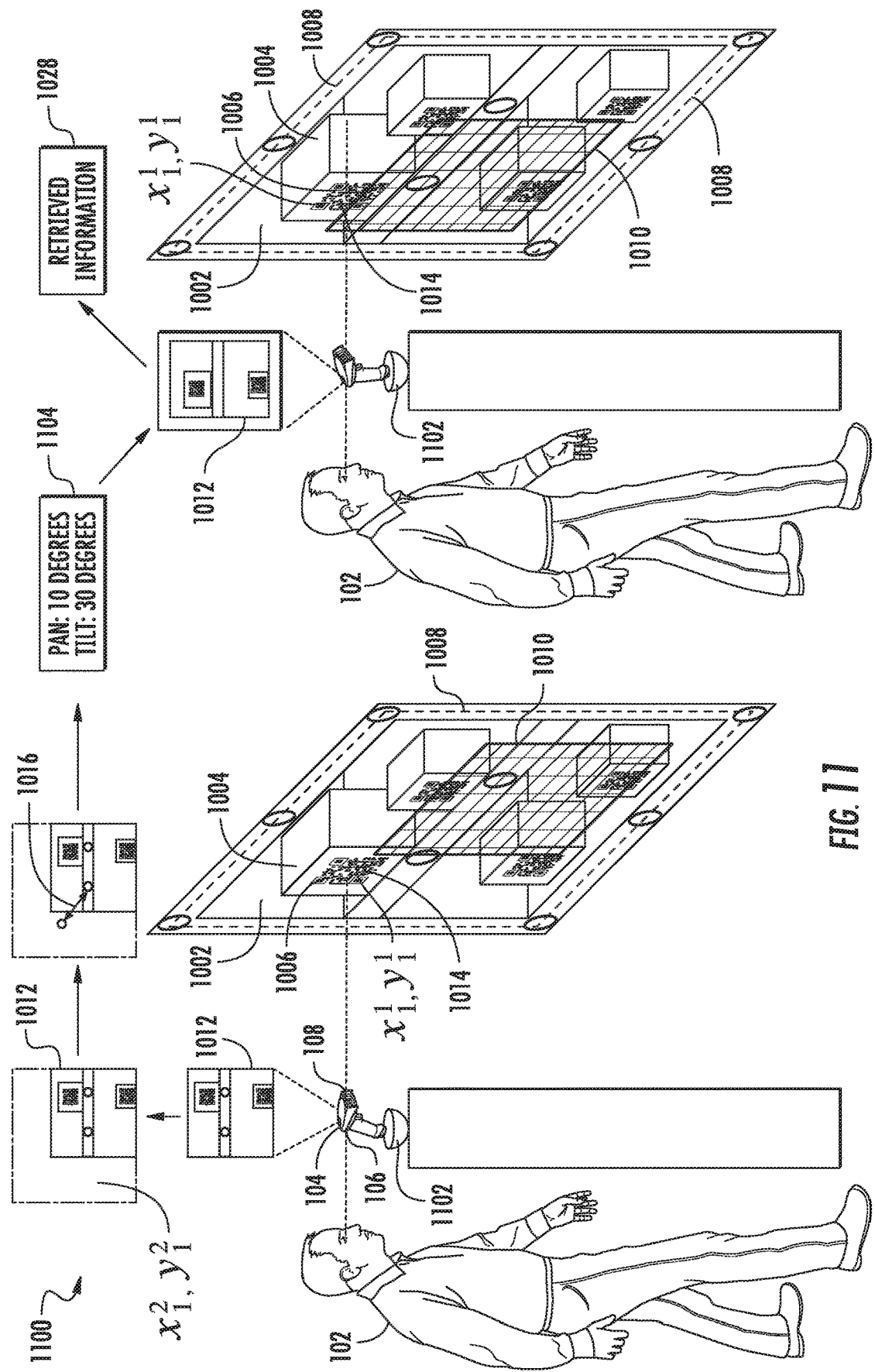
FIG. 11 illustrates another and/or additional example operation of the indicia scanner, in accordance with one or more embodiments described herein.

FIG. 11 illustrates another example operation of the indicia scanner 104, in accordance with one or more embodiments. The exemplary method 1100 has been described in conjunction with FIGS. 1 through 10.

From exemplary method 1100, it can be observed that the indicia scanner 104 is mounted on a movable hub 1102 that may be capable of modifying the orientation of the indicia scanner 104. For example, the movable hub 1102 is capable of modifying pan and tilt of the indicia scanner 104. Further, it can be observed that the user 102 is standing behind the indicia scanner 104 in such a manner that the sensor 106 points towards the user 102.

The operation of the exemplary method 1100 is similar to the operation described in the exemplary method 1000, except that the user 102 in exemplary method 1100 does not traverses the indicia scanner 104 along the path 1020. In the exemplary method 1100, after the determination of the distance 1016, the image processing unit 310 is configured to translate the determined distance in terms of pan and tilt values. For example, the pan and tilt values determined by the image processing unit 310 are 10 degrees and 30 degrees (depicted by 1102). Thereafter, the image processing unit 310 may be configured to actuate the one or more motors in the hub to modify the pan and tilt of the indicia scanner 104 (as depicted by 1104).

The pan and tilt of the indicia scanner is modified such that that field of view of the indicia scanner 104 includes the point 1014 depicted by the second coordinate $(x_1^2, y_1^2)$. Thereafter, similar operation as described in conjunction with FIG. 10 is performed.

Various embodiments illustrated herein encompass numerous advantages. Since the exact coordinate of the point being viewed by the user is determined, therefore, the image capturing assembly in the indicia scanner is able to utilize the auto focus technique to focus on the point based on the determined coordinate. Further, the point to be focused is known the indicia scanner 104, therefore the aimer in the indicia scanner 104 may not be required. Furthermore, in the scenario where the point being viewed by the user is not included in the field of view of the indicia scanner 104, the path that needs to be traversed by the indicia scanner 104 is determined. Further, the path is displayed to the user in one embodiment. The path allows the user to accurately move the indicia scanner 104 to the desired location to capture the image. In another embodiment, the indicia scanner 104 may automatically activate the one or more motors in the hub to modify at least the orientation of the indicia scanner 104 in order to bring the point to be captured in the field of view.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method comprising:
   receiving, by a controller, gaze data from a sensor in an indicia scanner, wherein the gaze data is representative of at least one of a tracked eye movement and a head gradient of a user;
   determining, by the controller, a point being viewed by the user based on the received gaze data by:
      determining, by the controller, whether the point being viewed is within a predetermined area defined external to the indicia scanner, and
      determining, by the controller, the first coordinates of the point based on the received gaze data and based on the determination that the point is within the predetermined area, the first coordinates being determined in a first coordinate system that is defined based on the predetermined area;

transforming, by the controller, the first coordinates of the point to second coordinates in a second coordinate system based on a defined relationship between the first coordinate system and the second coordinate system, wherein the second coordinate system is defined based on a field of view of an image capturing assembly in the indicia scanner;

causing, by the controller, a focal length of the image capturing assembly to be modified to focus on at least the point based on the second coordinates of the point; and causing, by the controller, an image of the field of view to be captured.

2. The method of claim 1 further comprising:

defining, by the controller, the predetermined area based on a set of first coordinates of one or more predetermined points that define the predetermined area;

receiving, by the controller, the gaze data from the sensor in an instance in which the user views a predetermined point of the one or more predetermined points; and correlating, by the controller, the gaze data with the set of first coordinates of the predetermined point being viewed by the user.

3. The method of claim 2, wherein the first coordinates of the point being viewed by the user is determined based on the correlation between the gaze data and the set of first coordinates of the one or more predetermined points.

4. The method of claim 1, wherein the gaze data is determined by:

determining a reflection point of a light source in an eye of the user; and determining a displacement vector between a central axis of the eye and the reflection point, wherein the displacement vector corresponds to the gaze data.

5. The method of claim 1, wherein the defined relationship between the first coordinate system and the second coordinate system corresponds to a mathematical relation.

6. The method of claim 1, wherein the captured image comprises the focused point.

7. The method of claim 1, wherein the point being viewed by the user corresponds to an indicia, and wherein the captured image includes the indicia.

8. The method of claim 7 further comprising decoding, by the controller, the indicia in the captured image to retrieve data encoded in the indicia.

9. The method of claim 1, wherein determining the point being viewed by the user further comprises determining, by the controller, whether the received gaze data is constant for a predetermined time period, wherein the first coordinates of the point is determined based on the determination that the gaze data is constant for the predetermined time period.

10. An apparatus comprising:

a sensor configured to track at least an eye movement and a head gradient of a user to determine gaze data, while the user views an indicia in a predetermined area defined external to the apparatus;

a controller communicatively coupled to the sensor, wherein the controller is configured to:

determine first coordinates, in a first coordinate system, of the indicia based on the gaze data;

transform the first coordinates of the indicia to second coordinates in a second coordinate system; and an image capturing assembly configured to modify a focal length of the image capturing assembly to focus on the indicia, based on the second coordinates of the indicia, wherein the second coordinates of the indicia are deterministic of a location of the indicia in a field of view of the image capturing assembly, and capture an image of the field of view of the image capturing assembly, wherein the captured image comprises the focused indicia, and wherein the focused indicia included in the captured image is decoded.

11. The apparatus of claim 10, wherein the controller is further configured to calibrate the sensor.

12. The apparatus of claim 11, wherein the controller is further configured to:

define the predetermined area based on the a set of first coordinates of one or more predetermined points that define the predetermined area;

receive the gaze data from the sensor in an instance in which the user views a predetermined point of the one or more predetermined points; and correlate the gaze data with the set of first coordinates of the predetermined point being viewed by the user.

13. The apparatus of claim 12, wherein the first coordinates of the indicia is determined based on the correlation between the gaze data and the set of first coordinates of the one or more predetermined points.

14. The apparatus of claim 10, wherein the first coordinate system is defined based on the predetermined area.

15. The apparatus of claim 10, wherein the second coordinate system is defined based on the field of view of the image capturing assembly.

16. The apparatus of claim 10, wherein the controller is further configured to transform the first coordinates of the indicia to the second coordinates based on a defined relationship between the first coordinate system and the second coordinate system, wherein the defined relationship corresponds to a mathematical relation.

17. The apparatus of claim 16, wherein the controller is configured to determine the defined relationship between the first coordinate system and the second coordinate system based on at least a scale between the predetermined area defined external to the apparatus and the predetermined area captured in the field of view of the image capturing assembly.

18. The apparatus of claim 10, wherein the controller is further configured to determine the first coordinates of the indicia based on a determination that the gaze data is constant for a predetermined time period.

19. The apparatus of claim 10, wherein the controller is further configured to determine the first coordinates of the indicia based on a determination that the indicia viewed by the user is within the predetermined area.

20. An indicia scanner comprising:

a housing comprising a portion having a first end and a second end, wherein the first end is proximal to an object during capturing of an image of the object, and wherein the second end is distal from the object during capturing of the image of the object;

a sensor positioned at the second end of the portion, wherein the sensor is configured to track at least an eye movement and a head gradient to determine gaze data, while the user views an indicia in a predetermined area defined external to the indicia scanner;

a control system enclosed in the housing, the control system comprising a controller communicatively coupled to the sensor, wherein the controller is configured to:

determine first coordinates, in a first coordinate system, of the indicia based on the gaze data;

transform the first coordinates of the indicia to second coordinates in a second coordinate system; and an image capturing assembly positioned at the first end of the portion, wherein the image capturing assembly is configured to:

modify a focal length of the image capturing assembly to focus on the indicia, based on the second coordinates of the indicia, wherein the second coordinates of the indicia are deterministic of a location of the indicia in a field of view of the image capturing assembly, and capture an image of the field of view of the image capturing assembly, wherein the captured image comprises focused indicia, and wherein the focused indicia is decoded.

* * * * *